United States Patent
Kim et al.

(10) Patent No.: US 11,539,416 B2
(45) Date of Patent: *Dec. 27, 2022

(54) METHOD FOR REPORTING CHANNEL STATE INFORMATION IN WIRELESS COMMUNICATION SYSTEM AND APPARATUS FOR THE SAME

(71) Applicant: LG ELECTRONICS INC., Seoul (KR)

(72) Inventors: Hyungtae Kim, Seoul (KR); Jiwon Kang, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/144,453

(22) Filed: Jan. 8, 2021

(65) Prior Publication Data

US 2021/0135725 A1 May 6, 2021

Related U.S. Application Data

(63) Continuation of application No. 16/557,361, filed on Aug. 30, 2019, now Pat. No. 10,944,458, which is a
(Continued)

(30) Foreign Application Priority Data

Apr. 19, 2018 (KR) .................. 10-2018-0045456

(51) Int. Cl.
*H04B 7/06* (2006.01)
*H04B 7/024* (2017.01)
(Continued)

(52) U.S. Cl.
CPC ........... *H04B 7/0626* (2013.01); *H04B 7/024* (2013.01); *H04B 7/0456* (2013.01);
(Continued)

(58) Field of Classification Search
None
See application file for complete search history.

(56) References Cited

U.S. PATENT DOCUMENTS 9,762,372 B2 9/2017 Ekpenyong et al.
10,439,700 B2 10/2019 Kim et al.
(Continued)

FOREIGN PATENT DOCUMENTS

CN 103875198 6/2014
CN 104170411 11/2014
(Continued)

OTHER PUBLICATIONS

3$^{rd}$ Generation Partnership Project, LG Electronics, "Discussions on CSI reporting," R1-1717940, 3GPP TSG RAN WG1, Prague, Czech Republic, dated Oct. 9-13, 2017, 8 pages.
(Continued)

*Primary Examiner* — Rebecca E Song
(74) *Attorney, Agent, or Firm* — Fish & Richardson P.C.

(57) ABSTRACT

The present invention provides a method of reporting, by a UE, CSI in a wireless communication system, the method comprising: receiving, from a base station, a RRC signaling that comprises a plurality of reporting settings, wherein each reporting setting comprises a corresponding list of first values representing time offsets for transmitting a CSI report, forming a plurality of lists of first values; receiving, from the base station, DCI triggering the CSI report, wherein the DCI comprises an index value related to a time at which to transmit the CSI report on a PUSCH; determining, based on the DCI, a plurality of list entries; determining a second value that is largest among the plurality of list entries; and transmitting, to the base station, the CSI report on the PUSCH based on the second value.

20 Claims, 17 Drawing Sheets

Related U.S. Application Data continuation of application No. 16/202,562, filed on Nov. 28, 2018, now Pat. No. 10,439,700.

(60) Provisional application No. 62/591,727, filed on Nov. 28, 2017.

(51) Int. Cl.
| | | |
|---|---|---|
| *H04L 5/00* | (2006.01) | |
| *H04W 24/10* | (2009.01) | |
| *H04B 7/0456* | (2017.01) | |
| *H04W 76/27* | (2018.01) | |
| *H04W 72/08* | (2009.01) | |
| *H04W 72/04* | (2009.01) | |

(52) U.S. Cl.
CPC ......... *H04B 7/0639* (2013.01); *H04L 5/0048* (2013.01); *H04L 5/0057* (2013.01); *H04L 5/0078* (2013.01); *H04L 5/0091* (2013.01); *H04W 24/10* (2013.01); *H04W 72/085* (2013.01); *H04W 76/27* (2018.02); *H04L 5/0007* (2013.01); *H04W 72/042* (2013.01)

(56) References Cited

U.S. PATENT DOCUMENTS

| | | | |
|---|---|---|---|
| 2011/0170435 | A1 | 7/2011 | Kim et al. |
| 2017/0026938 | A1 | 1/2017 | Onggosanusi et al. |
| 2017/0078065 | A1 | 3/2017 | Nam et al. |
| 2017/0208571 | A1 | 7/2017 | Lee et al. |
| 2017/0359746 | A1 | 12/2017 | Lee et al. |
| 2018/0062724 | A1 | 3/2018 | Onggosanusi et al. |
| 2018/0083684 | A1 | 3/2018 | He et al. |
| 2018/0123769 | A1 | 5/2018 | Pelletier et al. |
| 2018/0278392 | A1 | 9/2018 | Onggosanusi et al. |
| 2019/0053089 | A1 | 2/2019 | Kwak et al. |
| 2019/0165847 | A1 | 5/2019 | Kim et al. |
| 2019/0335475 | A1* | 10/2019 | Liang .................. H04L 5/0053 |
| 2019/0379483 | A1 | 12/2019 | Tang |
| 2020/0052804 | A1 | 2/2020 | Hao et al. |
| 2020/0177253 | A1* | 6/2020 | Wu ....................... H04W 72/14 |

FOREIGN PATENT DOCUMENTS

| | | |
|---|---|---|
| CN | 110741583 | 1/2020 |
| EP | 2777198 | 12/2015 |
| EP | 3552333 | 7/2020 |
| JP | 6730521 | 7/2020 |
| KR | 1020130083391 | 7/2013 |
| KR | 1020150039746 | 4/2015 |
| KR | 1020170091038 | 8/2017 |
| KR | 1020170115490 | 10/2017 |
| KR | 1020170128153 | 11/2017 |
| WO | WO2017189034 | 11/2017 |
| WO | WO2019103562 | 5/2019 |
| WO | WO2019134099 | 7/2019 |

OTHER PUBLICATIONS

3rd Generation Partnership Project, LG Electronics, "Discussions on CSI Reporting," R1-1719906, 3GPP TSG RAN WG1, Reno, USA, dated Nov. 27-Dec. 1, 2017, 8 pages.

3rd Generation Partnership Project, LG Electronics, Ericcson, InterDigital, Samsung, "WF on CSI timing offset PUSCH," R1-1721527, 3GPP TSG RAN WG1, Reno, USA, dated Nov. 27-Dec. 1, 2017, 5 pages.

3rd Generation Partnership Project, LG Electronics, Samsung, KT, "WF on CSI timing," R1-1718953, 3GPP TSG RAN WG1, Prague, Czech Republic, dated Oct. 9-13, 2017, 3 pages.

Australian Office Action in Australian Appln. No. 2018282267, dated Jun. 25, 2019, 6 pages.

Brazilian Office Action in Brazilian Appln. No. BRI 12019008357, dated Nov. 27, 2019, 9 pages (with English translation).

Ericsson, "CSI Framework", R1-1716347, 3GPP TSG RAN WG1 NR Ad Hoc #3, Nagoya, Japan, dated Sep. 12, 2017, 12 pages.

LG Electronics, "Discussion on CSI framework", R1-1710284, 3GPP TSG RAN WG1 NR Ad-Hoc#2, Qingdao, P. R. China, dated Jun. 17, 2017, 9 pages.

Nokia Siemens Networks, Nokia, "CSI reporting for Carrier Aggregation," R1-102952, 3GPP TSG RAN WG1 Meeting #60bis, Beijing, China, dated Apr. 12-16, 2010, 2 pages.

PCT International Search Report in International Appln. No. PCT/KR2018/014708, dated Mar. 15, 2019, 3 pages.

Qualcomm Incorporated, "Details of CSI framework", R1-1718544, 3GPP TSG RAN WG1 Meeting #90bis, Prague, Czech, dated Oct. 3, 2017, 8 pages.

Supplementary European Search Report in European Appln. No. 18814760.7, dated May 18, 2020, 11 pages.

Verizon 5G TF; Air Interface Working Group; Verizon 5th Generation Radio Access, "Multiplexing and channel coding (Release 1)," TS V5G.212 V1.2, dated Jun. 2016, 59 pages.

Zte et al., "Discussion on beam management", R1-1717424, 3GPP TSG RAN WG1 Meeting #90bis, Prague, Czech, dated Oct. 3, 2017, 14 pages.

Zte, Sanechips, "Discussion on beam management," R1-1717424, 3GPP TSG RAN WG1 Meeting #90-bis, Prague, Czechia, dated Oct. 9-13, 2017, 14 pages.

Zte, "Periodic CSI report transmission on PUSCH," R1-110816, Presented at 3GPP TSG-RAN WG1 #64, Taipei, Feb. 21-Feb. 25, 2011, 4 pages.

Potevio, "Correction on UE procedure for reporting CSI and HARQ-ACK," R1-111569, Change Request, Presented at 3GPP TSG-RAN WG1 Meeting #65, Barcelona, Spain, May 9-13, 2011, 19 pages.

Notice of Allowance in Chinese Appln. No. 201880039318.7, dated Oct. 28, 2021, 10 pages (with English translation).

Office Action in Indonesian Application No. P-00201900683, dated Sep. 19, 2022, 2 pages.

* cited by examiner

[FIG. 1]
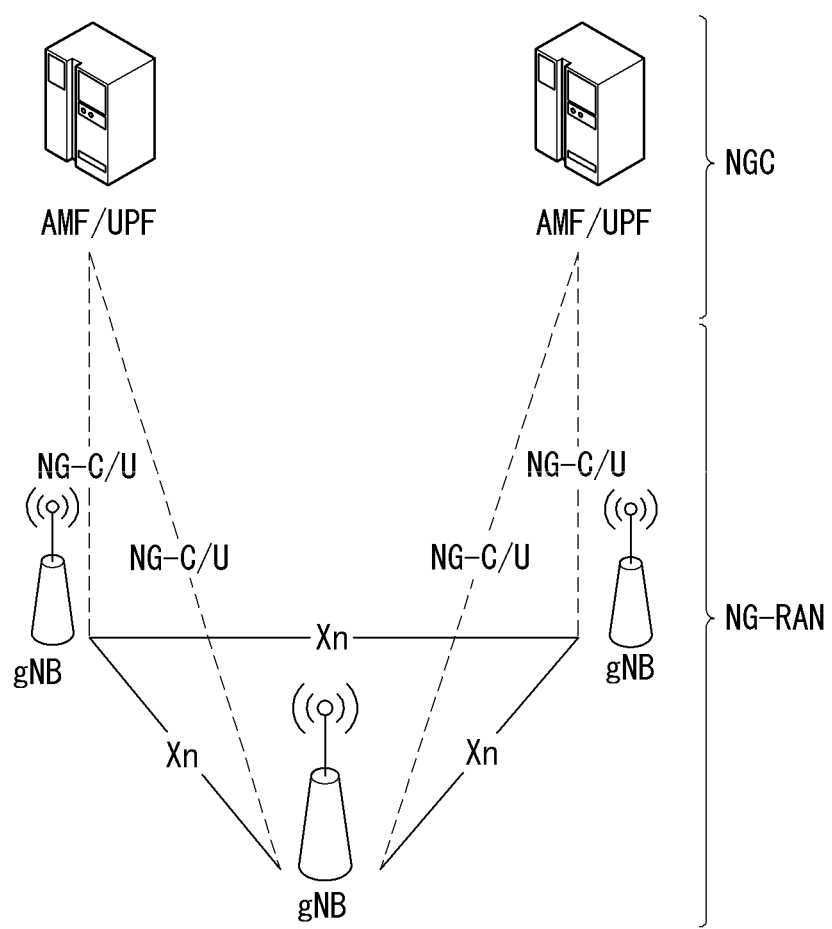

[FIG. 2]
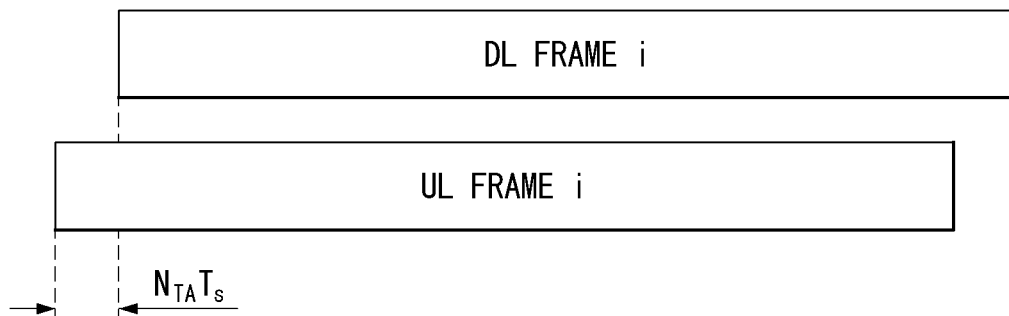

[FIG. 3]
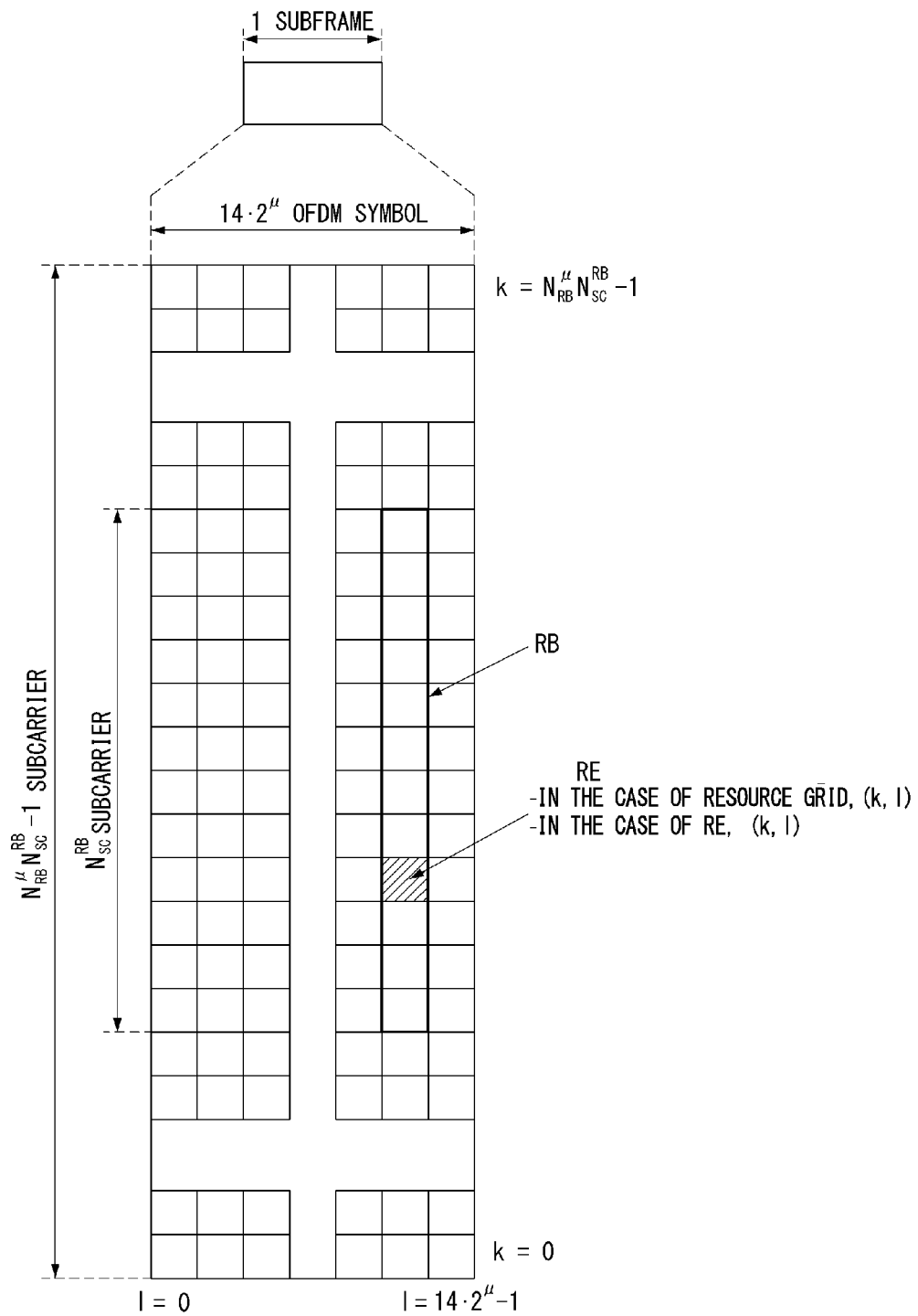

[FIG. 4]
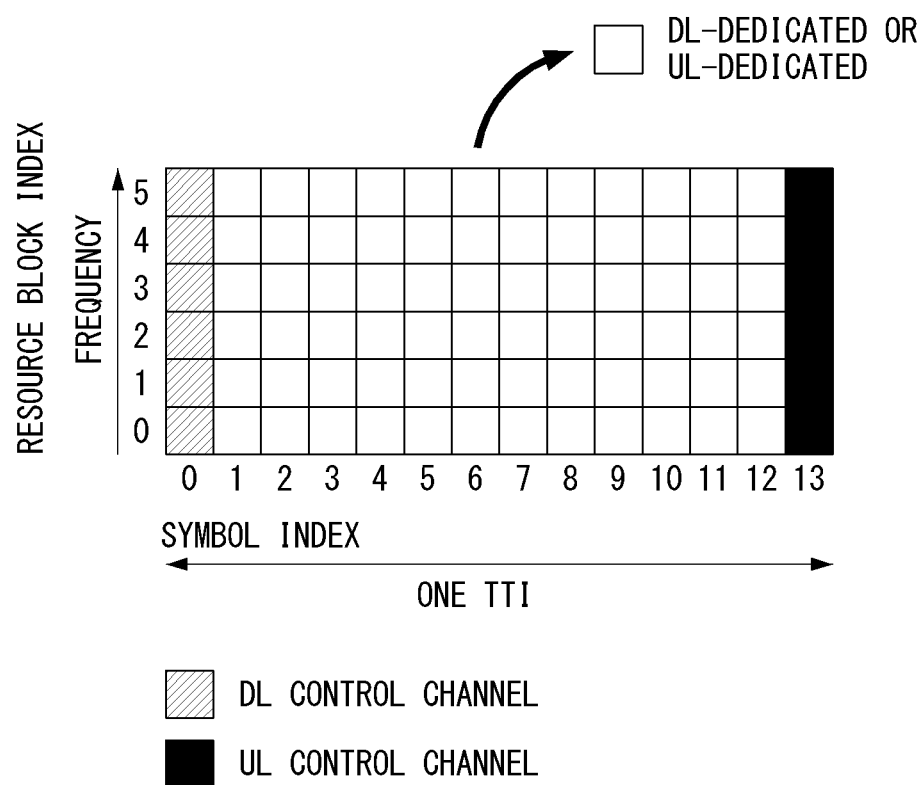

[FIG. 5]
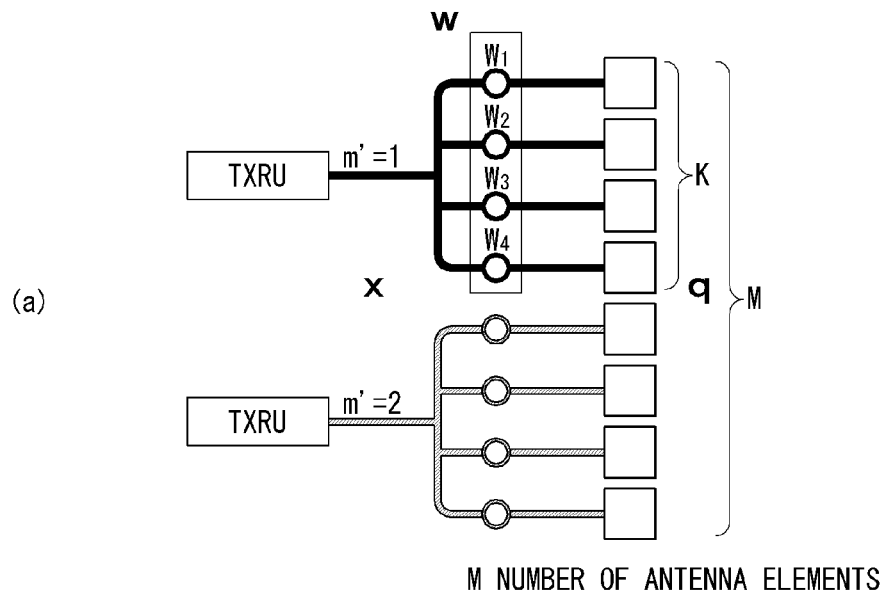
(a)
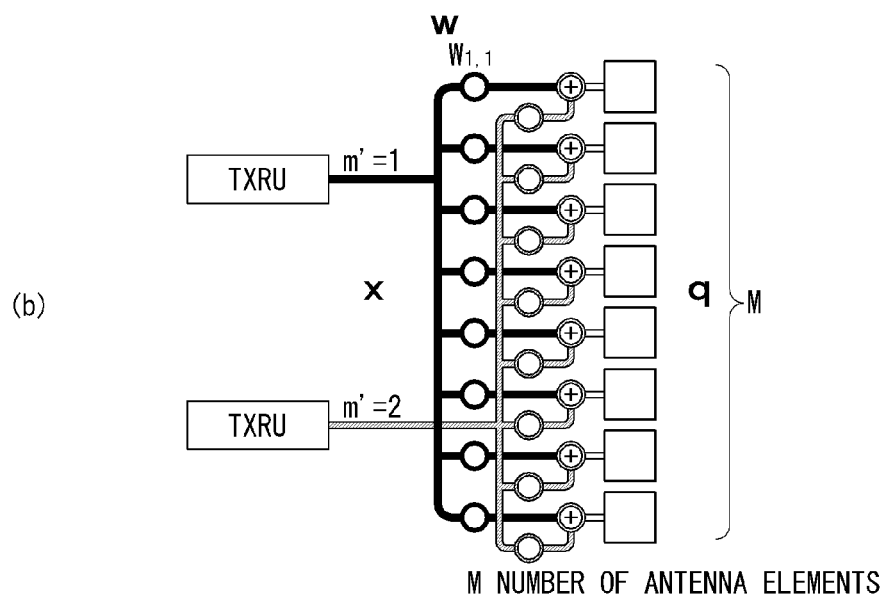
(b)

[FIG. 6]
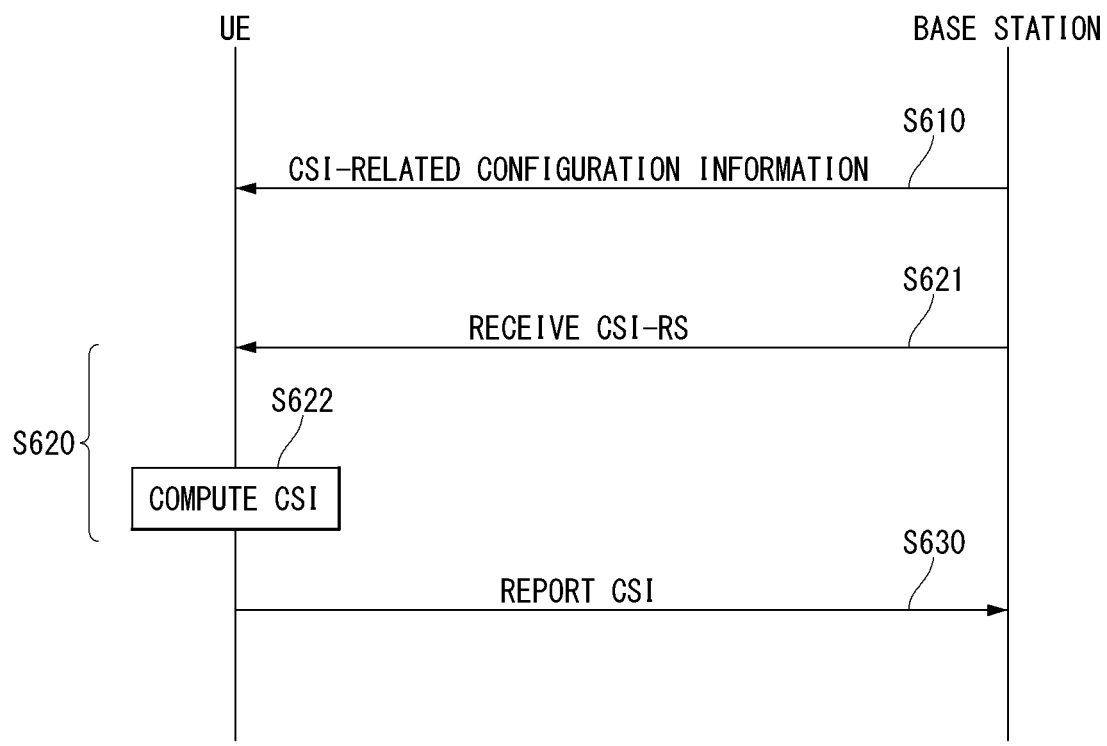

[FIG. 7]
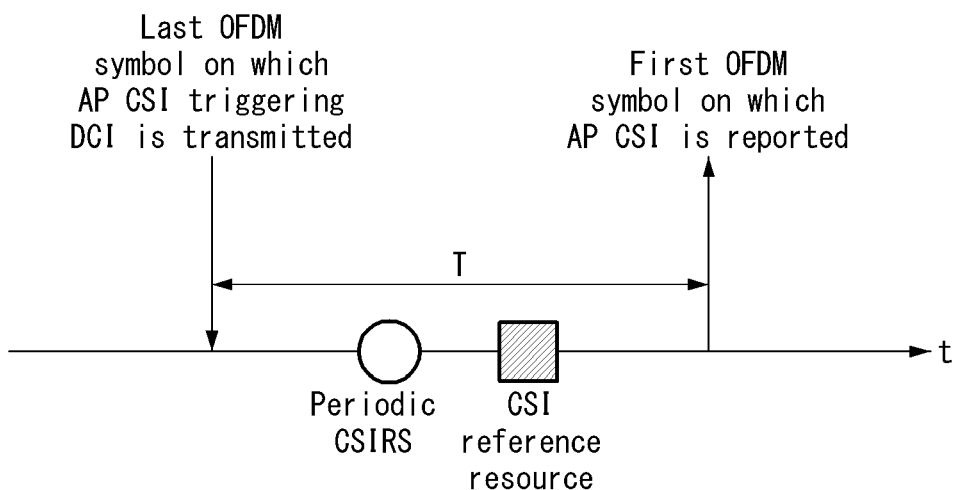
[FIG. 8]
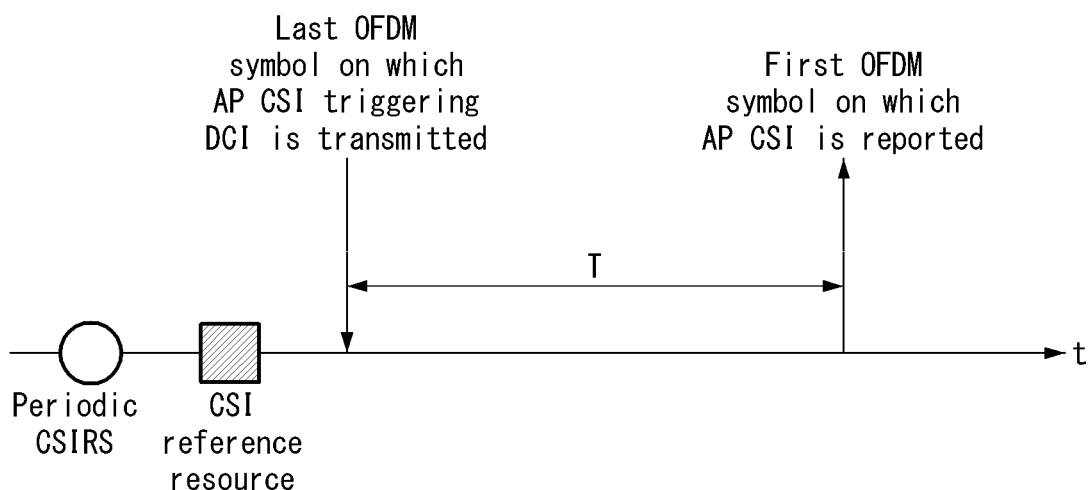

[FIG. 9]
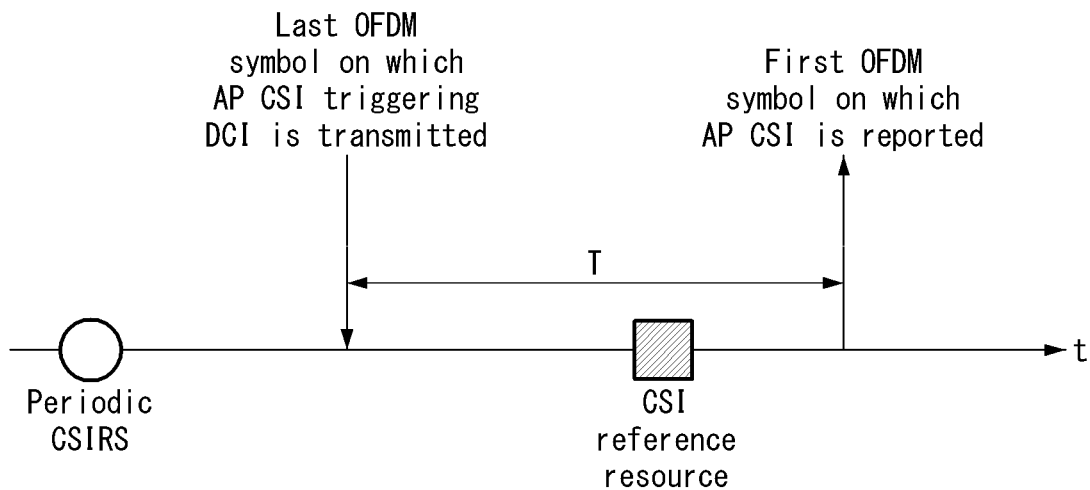
[FIG. 10]
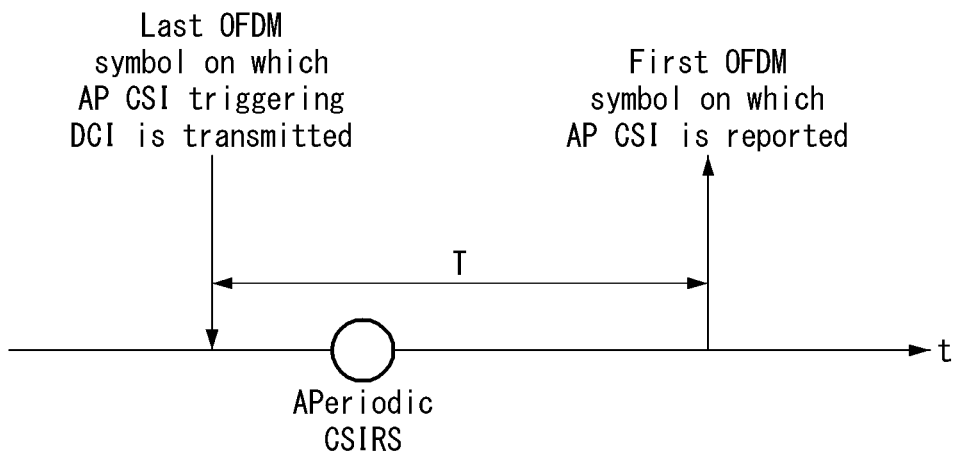

[FIG. 11]
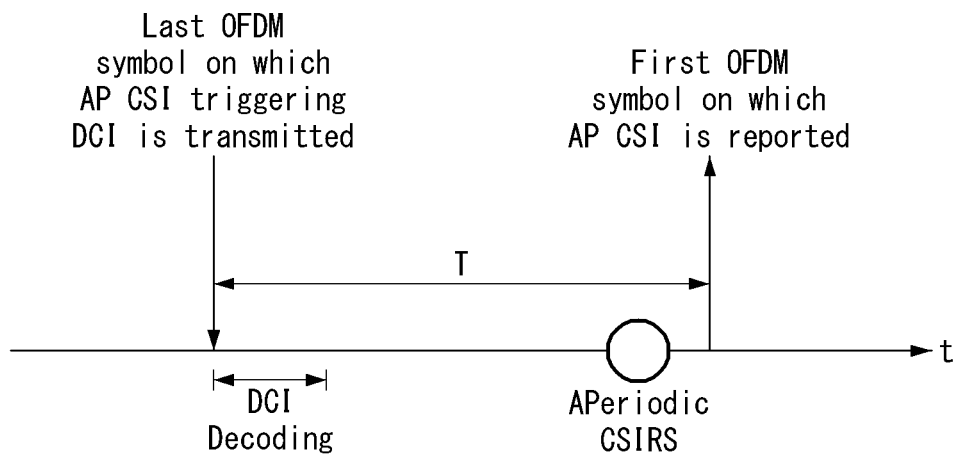
[FIG. 12]
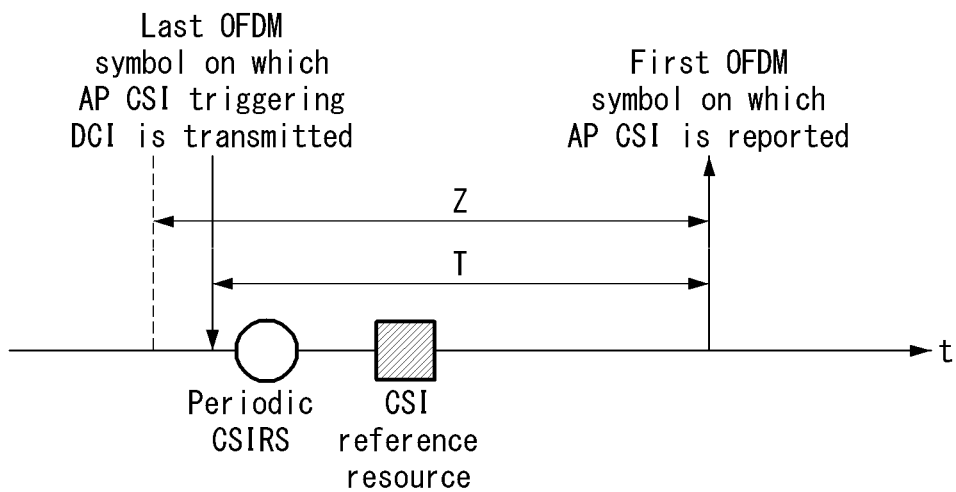

[FIG. 13]
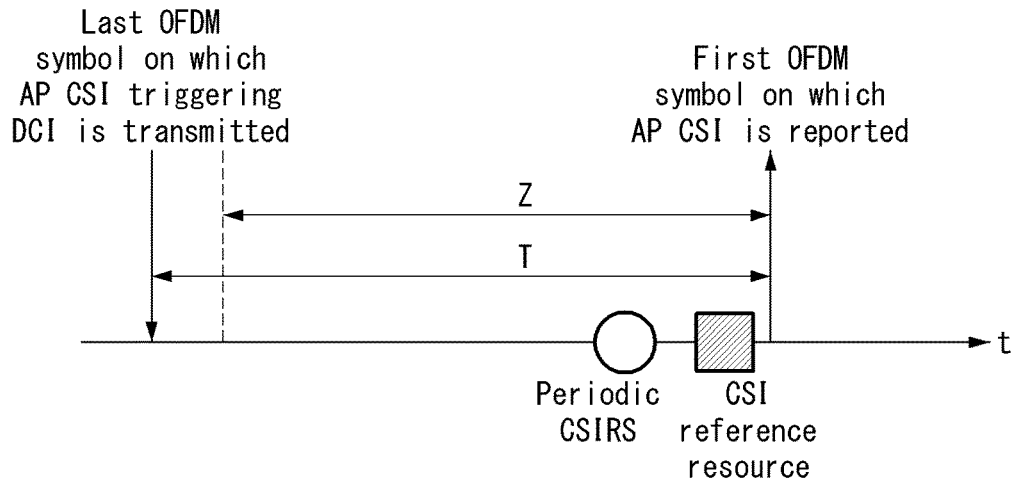
[FIG. 14]
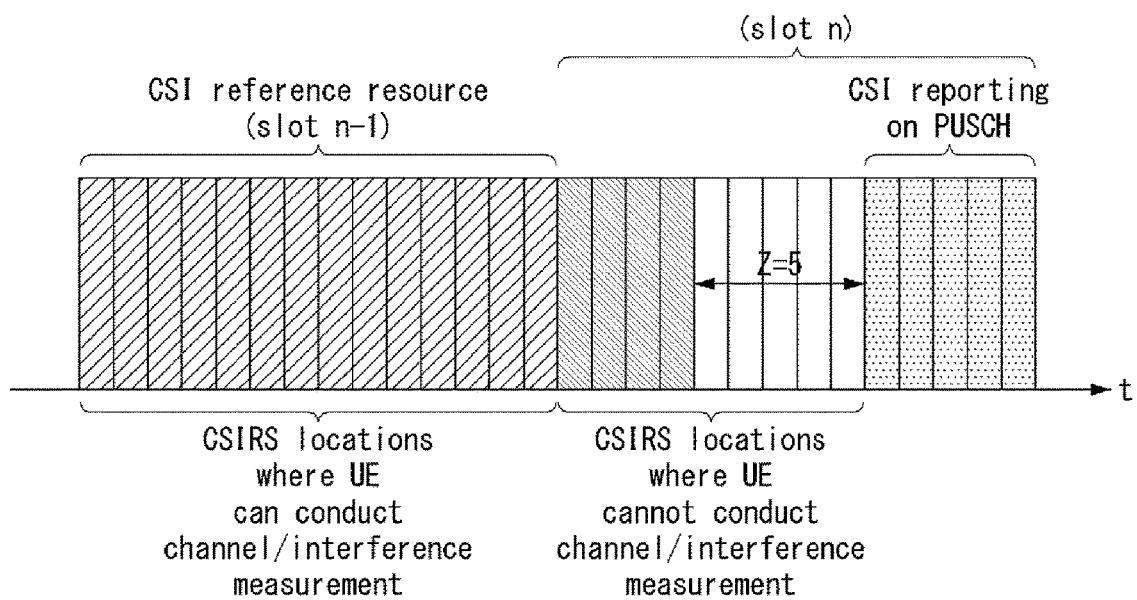

[FIG. 15]
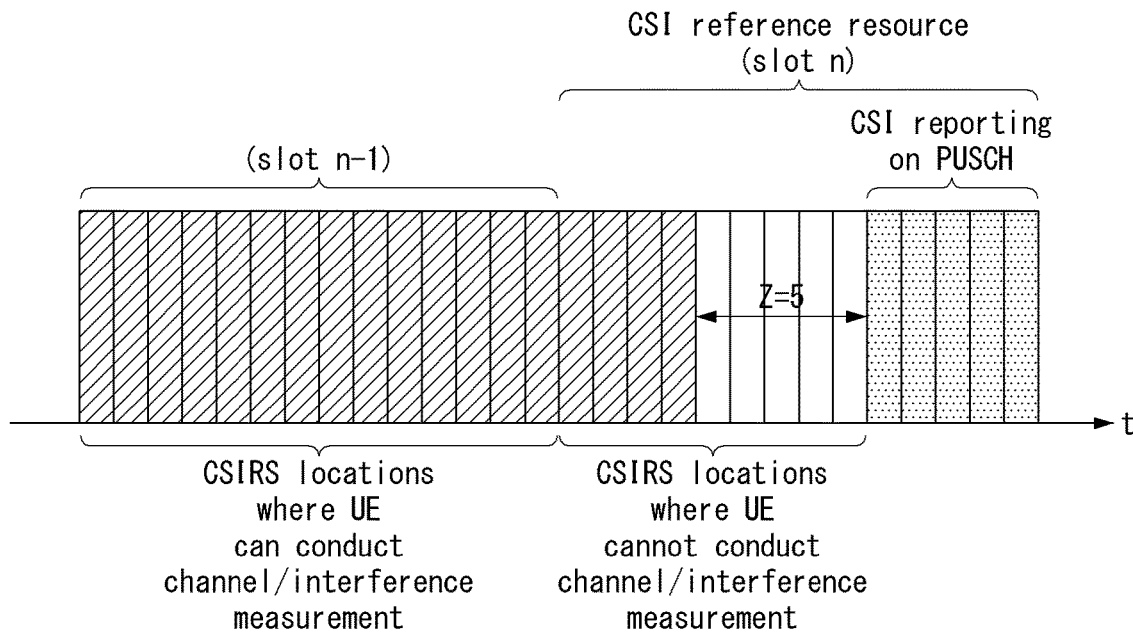
[FIG. 16]
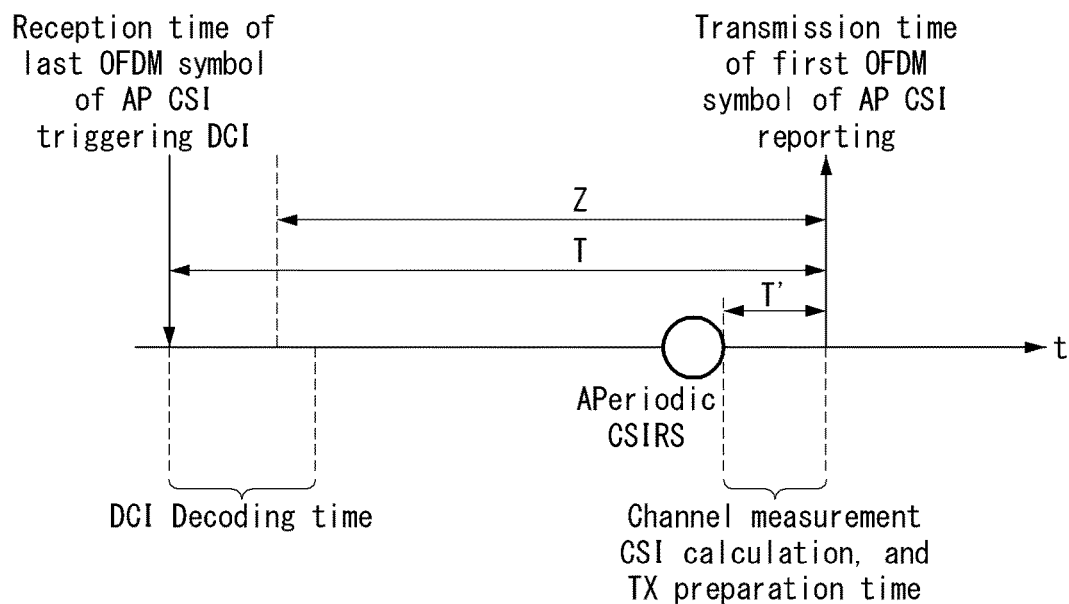

[FIG. 17]
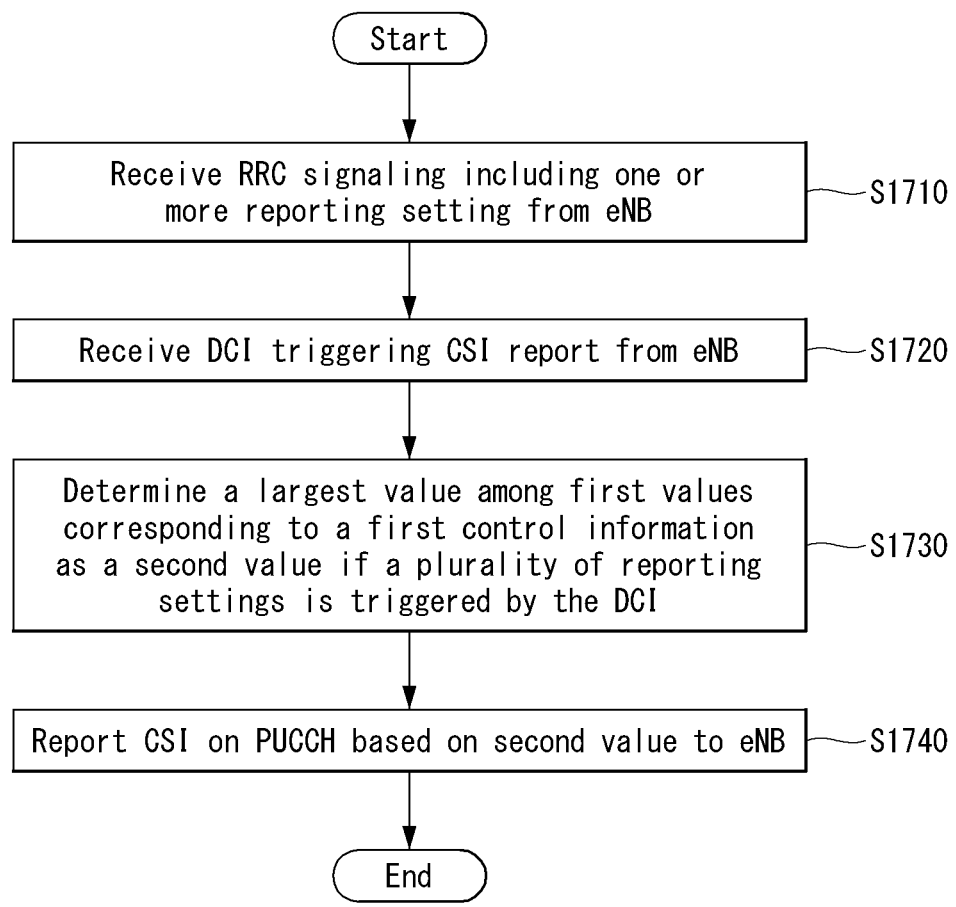

【FIG. 18】
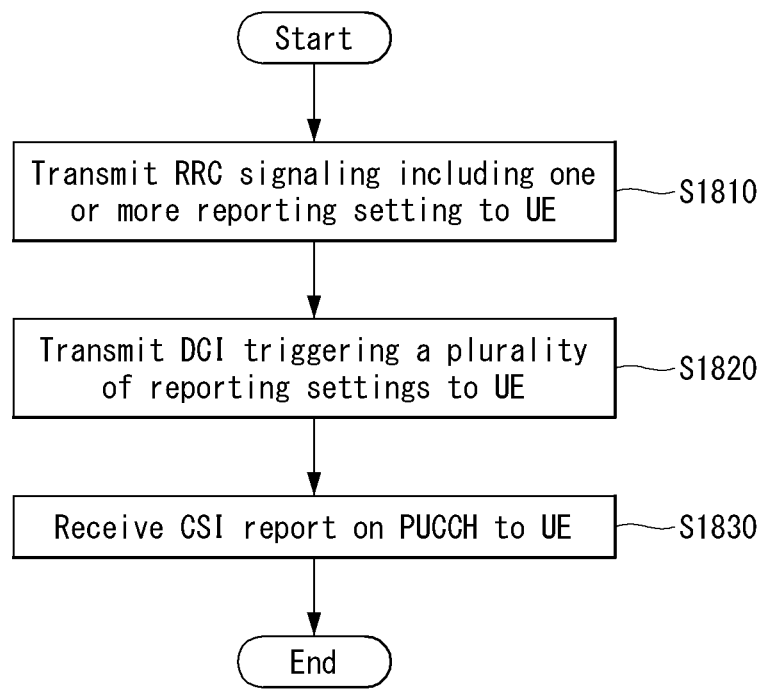

[FIG. 19]
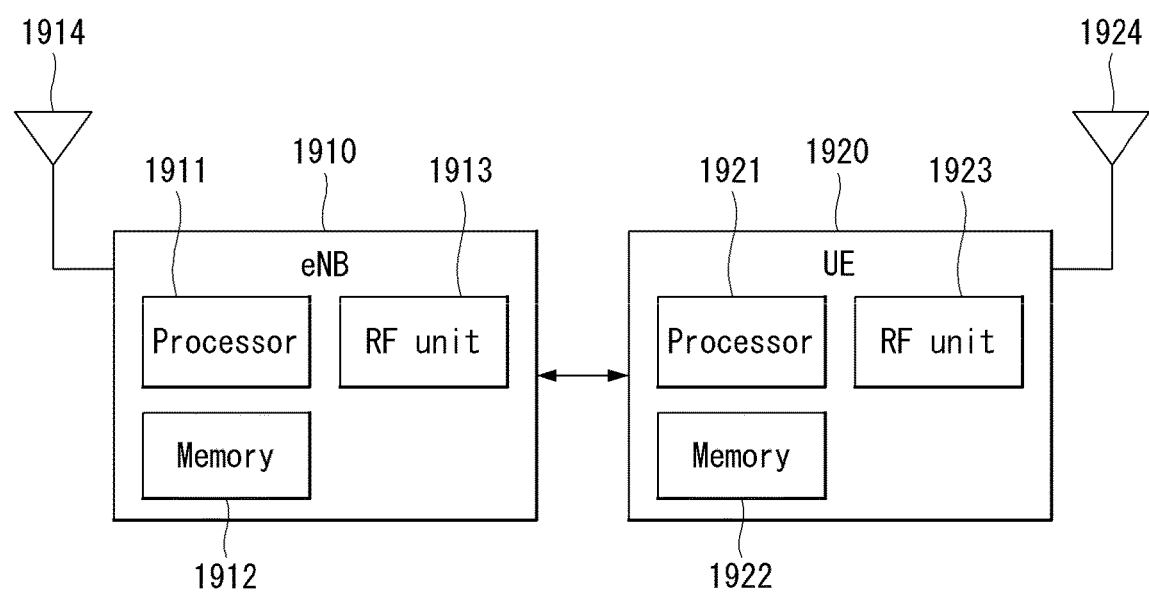

[FIG. 20]
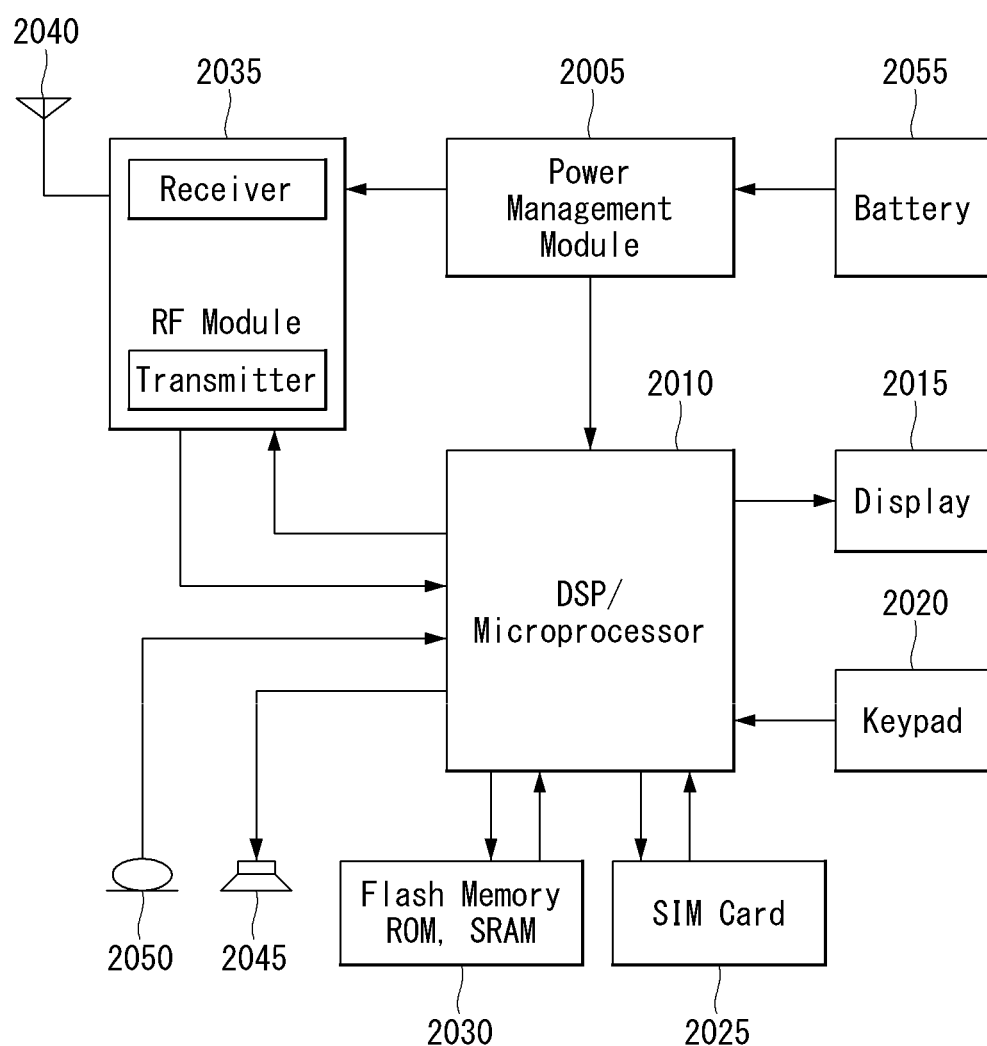

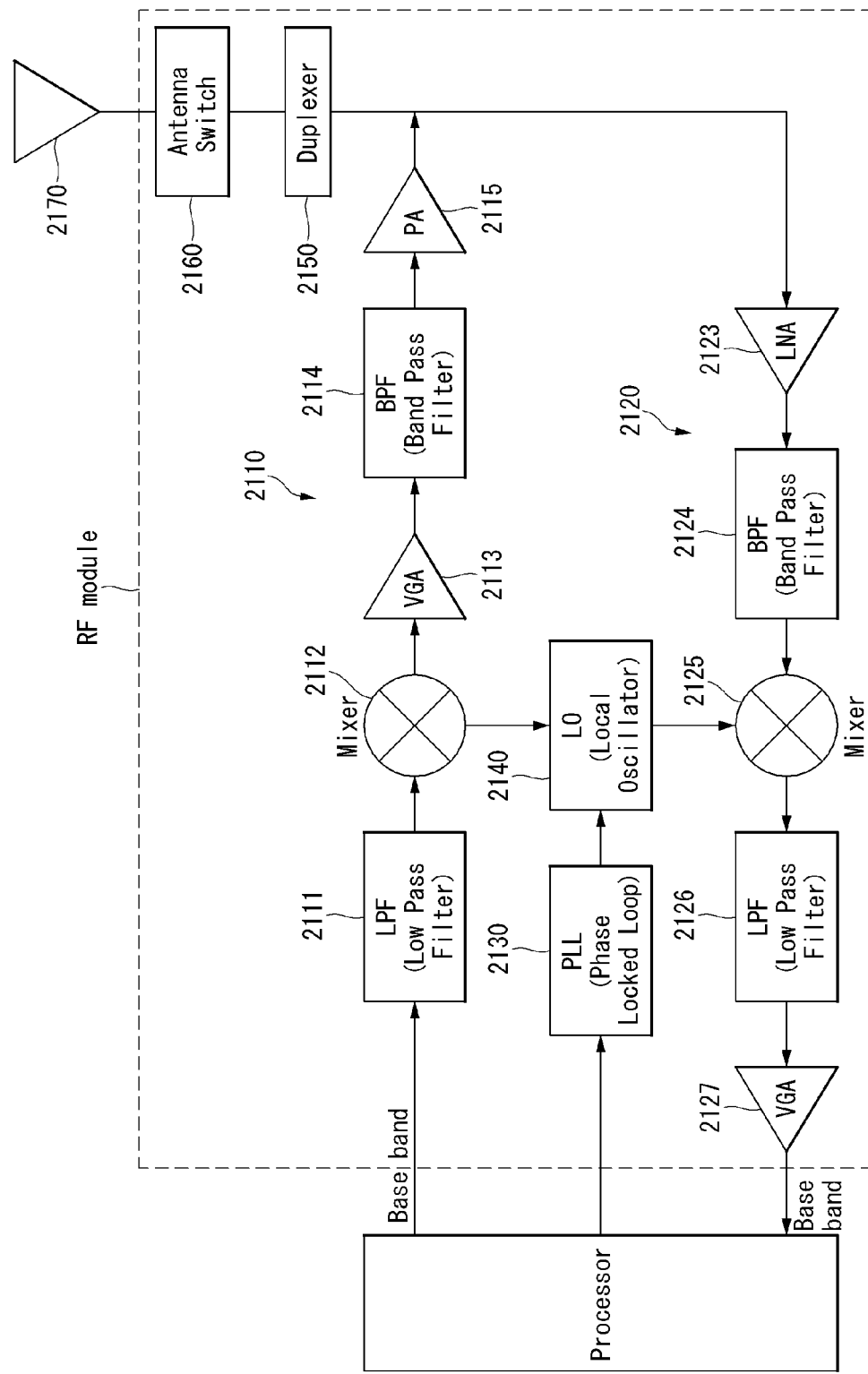
[FIG. 21]

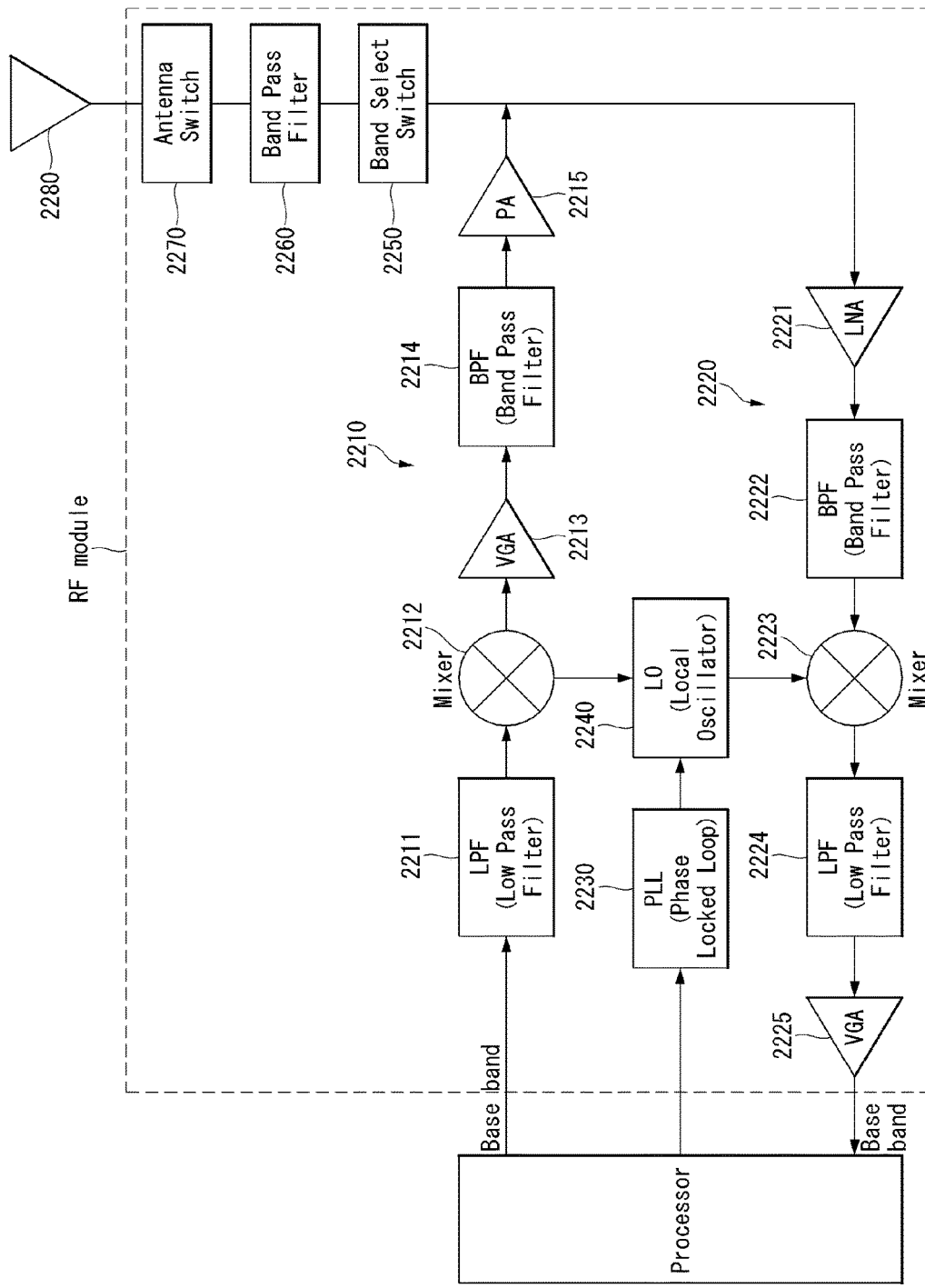
[FIG. 22]

METHOD FOR REPORTING CHANNEL STATE INFORMATION IN WIRELESS COMMUNICATION SYSTEM AND APPARATUS FOR THE SAME

CROSS-REFERENCE TO RELATED APPLICATIONS

This application is a continuation of and claims priority to U.S. patent application Ser. No. 16/557,361, filed on Aug. 30, 2019 which is a continuation of U.S. patent application Ser. No. 16/202,562, filed on Nov. 28, 2018, which claims the benefit of U.S. Provisional Application No. 62/591,727, filed on Nov. 28, 2017, and KR Application No. 10-2018-0045456, filed on Apr. 19, 2018. The disclosures of the prior applications are incorporated by reference in their entirety.

BACKGROUND OF THE INVENTION

Field of the Invention

The present invention relates to wireless communication and, more particularly, to a method for reporting Channel State Information (CSI) and an apparatus for supporting the method.

Related Art

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

SUMMARY OF THE INVENTION

The present invention provides a method for determining a slot offset associated with a CSI report when a plurality of reporting settings is triggered by DCI.

The technical objects of the present invention are not limited to the aforementioned technical objects, and other technical objects, which are not mentioned above, will be apparently appreciated by a person having ordinary skill in the art from the following description.

The present document provides a method for transmitting and receiving a CSI-RS in a wireless communication system.

More specifically, a method performed by a user equipment (UE) comprises receiving, from a base station, a radio resource control (RRC) signaling that comprises a plurality of reporting settings, wherein each reporting setting comprises a corresponding list of first values representing time offsets for transmitting a CSI report, forming a plurality of lists of first values; receiving, from the base station, downlink control information (DCI) triggering the CSI report, wherein the DCI comprises an index value related to a time at which to transmit the CSI report on a physical uplink shared channel (PUSCH); determining, based on the DCI, a plurality of list entries by determining, for each list in the plurality of lists of first values, a corresponding list entry that is indexed in the list based on the index value; determining a second value that is largest among the plurality of list entries; and transmitting, to the base station, the CSI report on the PUSCH based on the second value.

Also, according to the present invention, the CSI report comprises an aperiodic CSI report.

Also, according to the present invention, receiving the DCI comprises receiving the DCI on a slot n, and transmitting the CSI report comprises transmitting the CSI report on a slot n+(second value).

Also, according to the present invention, the index value is represented by 2 bits, and the index value is represented by one of 00, 01, 10 or 11.

Also, according to the present invention, the index value of 00 corresponds to a first entry in each of the plurality of lists of first values, the index value of 01 corresponds to a second entry in each of the plurality of lists of first values, the index value of 10 corresponds to a third entry in each of the plurality of lists of first values, and the index value 11 corresponds to a fourth entry in each of the plurality of lists of first values.

Also, according to the present invention, the index value is greater than or equal to zero, and each list entry is indexed in the corresponding list of first values at a position corresponding to 1+(index value) in the list.

Also, a user equipment (UE) configured to report channel state information (CSI) in a wireless communication system, the UE comprising: a radio frequency (RF) module; at least one processor; and at least one computer memory operably connectable to the at least one processor and storing instructions that, when executed, cause the at least one processor to perform operations comprising: receiving, from a base station, a radio resource control (RRC) signaling that comprises a plurality of reporting settings, wherein each reporting setting comprises a corresponding list of first values representing time offsets for transmitting a CSI report, forming a plurality of lists of first values; receiving, from the base station, downlink control information (DCI) triggering the CSI report, wherein the DCI comprises an index value related to a time at which to transmit the CSI report on a physical uplink shared channel (PUSCH); determining, based on the DCI, a plurality of list entries by determining, for each list in the plurality of lists of first values, a corresponding list entry that is indexed in the list based on the index value; determining a second value that is largest among the plurality of list entries; and transmitting, to the base station, the CSI report on the PUSCH based on the second value.

BRIEF DESCRIPTION OF THE DRAWINGS

The accompanying drawings, which are included herein as a part of detailed descriptions to help understanding the present invention, provide embodiments of the present invention and describe technical features of the present invention with detailed descriptions below.

FIG. 1 illustrates one example of the overall system structure of an NR to which a method proposed by the present specification may be applied.

FIG. 2 illustrates a relationship between an uplink frame and a downlink frame in a wireless communication system to which a method proposed by the present specification may be applied.

FIG. 3 illustrates one example of a resource grid supported by a wireless communication system to which a method proposed by the present specification may be applied.

FIG. 4 illustrates one example of a self-contained subframe structure to which a method proposed by the present specification may be applied.

FIG. 5 illustrates a transceiver unit model in a wireless communication system to which the present invention may be applied.

FIG. 6 is a flow diagram illustrating one example of a CSI-related procedure.

FIG. 7 illustrates one example of the timing at which a periodic CSI-RS is received.

FIGS. 8 and 9 illustrate another example of the timing at which a period CSI-RS is received.

FIG. 10 illustrates one example of a method for measuring CSI by using an AP CSI-RS.

FIG. 11 illustrates one example of another method for measuring CSI by using an AP CSI-RS.

FIG. 12 illustrates one example of an A-CSI report trigger for single CSI proposed by the present specification.

FIG. 13 illustrates one example of an A-CSI report trigger for single CSI having a periodic CSI-RS proposed by the present specification.

FIGS. 14 and 15 illustrate examples of a method for determining a time offset of a CSI reference resource proposed by the present specification.

FIG. 16 illustrates an A-CSI report trigger for single CSI having an aperiodic CSI-RS proposed by the present invention.

FIG. 17 is a flowchart illustrating an example of an operation method of a UE that performs a CSI report proposed by the present invention.

FIG. 18 is a flowchart illustrating an example of an operation method of an eNB that receives a CSI report proposed by the present invention.

FIG. 19 illustrates a block diagram of a wireless communication device to which methods proposed in the present invention may be applied.

FIG. 20 illustrates a block diagram of a communication device according to an embodiment of the present invention.

FIG. 21 is a diagram illustrating an example of an RF module of the wireless communication device to which the method proposed in the present invention may be applied.

FIG. 22 is a diagram illustrating another example of the RF module of the wireless communication device to which the method proposed in the present invention may be applied.

DESCRIPTION OF EXEMPLARY EMBODIMENTS

In what follows, preferred embodiments of the present invention will be described in detail with reference to appended drawings. Detailed descriptions to be disclosed below with reference to the appended drawings are intended to describe illustrative embodiments of the present invention but are not intended to represent the sole embodiment of the present invention. Detailed descriptions below include specific details to provide complete understanding of the present invention. However, it should be understood by those skilled in the art that the present invention may be embodied without the specific details to be introduced.

In some cases, to avoid obscuring the gist of the present invention, well-known structures and devices may be omitted or may be depicted in the form of a block diagram with respect to core functions of each structure and device.

A base station in this document is regarded as a terminal node of a network, which performs communication directly with a UE. In this document, particular operations regarded to be performed by the base station may be performed by an upper node of the base station depending on situations. In other words, it is apparent that in a network consisting of a plurality of network nodes including a base station, various operations performed for communication with a UE can be performed by the base station or by network nodes other than the base station. The term Base Station (BS) may be replaced with a term such as fixed station, Node B, evolved-NodeB (eNB), Base Transceiver System (BTS), Access Point (AP), or general NB (gNB). Also, a terminal can be fixed or mobile; and the term may be replaced with a term such as User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understanding of the present invention, and the specific terms may be used in different ways as long as it does not leave the technical scope of the present invention.

The technology described below may be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA may be implemented by such radio technology as Universal Terrestrial Radio Access (UTRA) or CDMA2000. TDMA can be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

The 5G NR defines enhanced Mobile Broadband (eMBB), massive Machine Type Communication (mMTC), Ultra-Reliable and Low Latency Communications (URLLC), and vehicle-to-everything (V2X) depending on usage scenarios.

And the 5G NR standard is divided into standalone (SA) and non-standalone (NSA) modes according to co-existence between the NR system and the LTE system.

And the 5G NR supports various subcarrier spacing and supports CP-OFDM for downlink transmission while CP-OFDM and DFT-s-OFDM (SC-OFDM) for uplink transmission.

The embodiments of the present invention may be supported by standard documents disclosed for at least one of wireless access systems such as the IEEE 802, 3GPP, and 3GPP2. In other words, those steps or portions among embodiments of the present invention not described to clearly illustrate the technical principles of the present invention may be backed up by the aforementioned documents. Also, all of the terms disclosed in the present document may be described by the aforementioned standard documents.

For the purpose of clarity, descriptions are given mainly with respect to the 3GPP LTE/LTE-A, but the technical features of the present invention are not limited to the specific system.

DEFINITION OF TERMS eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

Numerology: corresponds to one subcarrier spacing in the frequency domain. Different numerology may be defined by scaling reference subcarrier spacing by an integer N.

NR: NR Radio Access or New Radio

General System

FIG. 1 is a diagram illustrating an example of an overall structure of a new radio (NR) system to which a method proposed by the present disclosure may be implemented.

Referring to FIG. 1, an NG-RAN is composed of gNBs that provide an

NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology μ, slots are numbered in ascending order of $n_s^\mu \in \{0, \ldots, N_{subframe}^{slots,\mu}-1\}$ in a subframe, and in ascending order of $n_{s,f}\ \mu \in \{0, \ldots, N_{frame}^{slots,\mu}-1\}$ frame in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
| --- | --- | --- | --- | --- | --- | --- |
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
| --- | --- | --- | --- | --- | --- | --- |
| | 0 | | | 1 | | |
| $\mu$ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 3 illustrates an example of a resource grid supported in a wireless communication system to which a method proposed by the present disclosure may be implemented.

Referring to FIG. 3, a resource grid is composed of $N_{RB}^{\mu}N_{sc}^{RB}$ subcarriers in a frequency domain, each subframe composed of 14·2μ OFDM symbols, but the present disclosure is not limited thereto.

In the NR system, a transmitted signal is described by one or more resource grids, composed of $N_{RB}^{\mu}N_{sc}^{RB}$ subcarriers, and $2^{\mu} N_{symb}^{(\mu)}$ OFDM symbols Herein, $N_{RB}^{\mu} \leq N_{RB}^{max,\mu}$. The above $N_{RB}^{max,\mu}$ indicates the maximum transmission bandwidth, and it may change not just between numerologies, but between UL and DL.

In this case, as illustrated in FIG. 3, one resource grid may be configured for the numerology μ and an antenna port p.

Each element of the resource grid for the numerology μ and the antenna port p is indicated as a resource element, and may be uniquely identified by an index pair (k,l). Herein, k=0, ..., $N_{RB}^{\mu}N_{sc}^{RB}-1$ is an index in the frequency domain, and l=0, ... $2^{\mu} N_{symb}^{(\mu)}-1$ indicates a location of a symbol in a subframe. To indicate a resource element in a slot, the index pair (k,l) is used. Herein, l=0, ... $N_{symb}^{\mu}-1$.

The resource element (k,l) for the numerology μ and the antenna port p corresponds to a complex value $a_{k,l}^{(p,\mu)}$. When there is no risk of confusion or when a specific antenna port or numerology is specified, the indexes p and μ may be dropped and thereby the complex value may become $a_{k,l}^{(p)}$ or $a_{k,l}$.

In addition, a physical resource block is defined as $N_{sc}^{RB}=12$ continuous subcarriers in the frequency domain. In the frequency domain, physical resource blocks may be numbered from 0 to $N_{RB}^{\mu}-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Subframe Structure

FIG. 4 is a diagram illustrating an example of a self-contained subframe structure in a wireless communication system to which the present disclosure may be implemented.

In order to minimize data transmission latency in a TDD system, 5G new RAT considers a self-contained subframe structure as shown in FIG. 4.

In FIG. 4, a diagonal line area (symbol index 0) represents a UL control area, and a black area (symbol index 13) represents a UL control area. A non0shade area may be used for DL data transmission or for UL data transmission. This structure is characterized in that DL transmission and UL transmission are performed sequentially in one subframe and therefore transmission of DL data and reception of UL ACK/NACK may be performed in the subframe. In conclusion, it is possible to reduce time for retransmitting data upon occurrence of a data transmission error and thereby minimize a latency of final data transmission.

In this self-contained subframe structure, a time gap is necessary for a base station or a UE to switch from a transmission mode to a reception mode or to switch from the reception mode to the transmission mode. To this end, some OFDM symbols at a point in time of switching from DL to UL in the self-contained subframe structure are configured as a guard period (GP).

Analog Beamforming

Since a wavelength is short in a Millimeter Wave (mmW) range, a plurality of antenna elements may be installed in the same size of area. That is, a wavelength in the frequency band 30 GHz is 1 cm, and thus, 64 (8×8) antenna elements may be installed in two-dimensional arrangement with a 0.5 lambda (that is, a wavelength) in 4×4 (4 by 4) cm panel. Therefore, in the mmW range, the coverage may be enhanced or a throughput may be increased by increasing a beamforming (BF) gain with a plurality of antenna elements.

In this case, in order to enable adjusting transmission power and phase for each antenna element, if a transceiver unit (TXRU) is included, independent beamforming for each frequency resource is possible. However, it is not cost-efficient to install TXRU at each of about 100 antenna elements. Thus, a method is considered in which a plurality of antenna elements is mapped to one TXRU and a direction of beam is adjusted with an analog phase shifter. Such an analog BF method is able to make only one beam direction over the entire frequency band, and there is a disadvantage that frequency-selective BF is not allowed.

A hybrid BF may be considered which is an intermediate between digital BF and analog BF, and which has B number of TXRU less than Q number of antenna elements. In this case, although varying depending upon a method of connecting B number of TXRU and Q number of antenna elements, beam directions capable of being transmitted at the same time is restricted to be less than B.

Hereinafter, typical examples of a method of connecting TXRU and antenna elements will be described with reference to drawings.

FIG. 5 is an example of a transceiver unit model in a wireless communication system to which the present disclosure may be implemented.

A TXRU virtualization model represents a relationship between output signals from TXRUs and output signals from antenna elements. Depending on a relationship between antenna elements and TXRUs, the TXRU virtualization model may be classified as a TXRU virtualization model option-1: sub-array partition model, as shown in FIG. 5(a), or as a TXRU virtualization model option-2: full-connection model.

Referring to FIG. 5(a), in the sub-array partition model, the antenna elements are divided into multiple antenna element groups, and each TXRU may be connected to one of the multiple antenna element groups. In this case, the antenna elements are connected to only one TXRU.

Referring to FIG. 5(b), in the full-connection model, signals from multiple TXRUs are combined and transmitted to a single antenna element (or arrangement of antenna elements). That is, this shows a method in which a TXRU is connected to all antenna elements. In this case, the antenna elements are connected to all the TXRUs.

In FIG. 5, q represents a transmitted signal vector of antenna elements having M number of co-polarized in one column. W represents a wideband TXRU virtualization weight vector, and W represents a phase vector to be multiplied by an analog phase shifter. That is, a direction of analog beamforming is decided by W. x represents a signal vector of M_TXRU number of TXRUs.

Herein, mapping of the antenna ports and TXRUs may be performed on the basis of 1-to-1 or 1-to-many.

TXRU-to-element mapping In FIG. 5 is merely an example, and the present disclosure is not limited thereto and may be equivalently applied even to mapping of TXRUs and antenna elements which can be implemented in a variety of hardware forms.

Channel State Information (CSI) Feedback

In most cellular systems including an LTE system, a UE receives a pilot signal (or a reference signal) for estimating a channel from a base station, calculate channel state information (CSI), and reports the CSI to the base station.

The base station transmits a data signal based on the CSI information fed back from the UE.

The CSI information fed back from the UE in the LTE system includes channel quality information (CQI), a pre-coding matrix index (PMI), and a rank indicator (RI).

CQI feedback is wireless channel quality information which is provided to the base station for a purpose (link adaptation purpose) of providing a guidance as to which modulation & coding scheme (MCS) to be applied when the base station transmits data.

In the case where there is a high wireless quality of communication between the base station and the UE, the UE may feed back a high CQI value and the base station may transmit data by applying a relatively high modulation order and a low channel coding rate. In the opposite case, the UE may feed back a low CQI value and the base station may transmit data by applying a relatively low modulation order and a high channel coding rate.

PMI feedback is preferred precoding matrix information which is provided to a base station in order to provide a guidance as to which MIMO precoding scheme is to be applied when the base station has installed multiple antennas.

A UE estimates a downlink MIMO channel between the base station and the UE from a pilot signal, and recommends, through PMI feedback, which MIMO precoding is desired to be applied by the base station.

In the LTE system, only linear MIMO precoding capable of expressing PMI configuration in a matrix form is considered.

The base station and the UE share a codebook composed of a plurality of precoding matrixes, and each MIMO precoding matrix in the codebook has a unique index.

Accordingly, by feeding back an index corresponding to the most preferred MIMO precoding matrix in the codebook as PMI, the UE minimizes an amount of feedback information thereof.

A PMI value is not necessarily composed of one index. For example, in the case where there are eight transmitter antenna ports in the LTE system, a final 8tx MIMO precoding matrix may be derived only when two indexes (first PMI & second PMI) are combined.

RI feedback is information on the number of preferred transmission layers, the information which is provided to the base station in order to provide a guidance as to the number of the UE's preferred transmission layers when the base station and the UE have installed multiple antennas to thereby enable multi-layer transmission through spatial multiplexing.

The RI and the PMI are very closely correlated to each other. It is because the base station is able to know which precoding needs to be applied to which layer depending on the number of transmission layers.

Regarding configuration of PMI/RM feedback, a PMI codebook may be configured with respect to single layer transmission and then PMI may be defined for each layer and fed back, but this method has a disadvantage that an amount of PMI/RI feedback information increases remarkably in accordance with an increase in the number of transmission layers.

Accordingly, in the LTE system, a PMI codebook is defined depending on the number of transmission layers. That is, for R-layer transmission, N number of NtxR matrixes are defined (herein, R represents the number of layers, Nt represents the number of transmitter antenna ports, and N represents the size of the codebook).

Accordingly, in LTE, a size of a PMI codebook is defined irrespective of the number of transmission layers. As a result, since PMI/RI is defined in this structure, the number of transmission layers (R) conforms to a rank value of the precoding matrix (NtxR matrix), and, for this reason, the term "rank indicator(RI)" is used.

Unlike PMI/RI in the LTE system, PMI/RI described in the present disclosure is not restricted to mean an index value of a precoding matrix NtxR and a rank value of the precoding matrix.

PMI described in the present disclosure indicates information on a preferred MINO precoder from among MIMO precoders capable of being applied by a transmitter, and a form of the precoder is not limited to a linear precoder which is able to be expressed in a matrix form, unlike in the LTE system. In addition, RI described in the present disclosure means wider than RO in LTE and includes feedback information indicating the number of preferred transmission layers.

The CSI information may be obtained in all system frequency domains or in some of the frequency domains. In particular, in a broad bandwidth system, it may be useful to obtain CSI information on some frequency domains (e.g., subband) preferred by each UE and then feedback the obtained CSI information.

In the LTE system, CSI feedback is performed via an UL channel, and, in general, periodic CSI feedback is performed via a physical uplink control channel (PUCCH) and aperiodic CSI feedback is performed via physical uplink shared channel (PUSCH) which is a UL data channel.

The aperiodic CSI feedback means temporarily transmitting a feedback only when a base station needs CSI feedback information, and the base station triggers the CSI feedback via a DL control channel such as a PDCCH/ePDCCH.

In the LTE system, which information a UE needs to feedback in response to triggering of CSI feedback is defined as a PUSCH CSI reporting mode, as shown in FIG. 8, and a PUSCH CSI reporting mode in which the UE needs to operate is informed for the UE in advance via a higher layer message.

Channel State Information (CSI)-Related Procedure

In the new radio (NR) system, a channel state information-reference signal (CSI-RS) is used for time/frequency tracking, CSI computation, layer 1 (L1)-reference signal received power (RSRP) computation, or mobility Throughout the present disclosure, "A and/or B" may be interpreted as the same as "including at least one of A or B".

The CSI computation is related to CSI acquisition, and L1-RSRP computation is related to beam management (BM).

The CSI indicates all types of information indicative of a quality of a radio channel (or link) formed between a UE and an antenna port.

Hereinafter, operation of a UE with respect to the CSI-related procedure will be described.

FIG. 6 is a flowchart illustrating an example of a CSI-related procedure.

To perform one of the above purposes of a CSI-RS, a terminal (e.g., a UE) receives CSI related configuration information from a base station (e.g., a general node B (gNB)) through a radio resource control (RRC) signaling (S610).

The CSI-related configuration information may include at least one of CSI interference management (IM) resource-related information, CSI measurement configuration-related information, CSI resource configuration-related information, CSI-RS resource-related information, or CSI report configuration-related information.

The CSIIM resource-related information may include CSI-IM resource information, CSI-IM resource set information, etc.

The CSI-IM resource set is identified by a CSI-IM resource set ID (identifier), and one resource set includes at least one CSI-IM resource.

Each CSI-IM resource is identified by a CSI-IM resource ID.

The CSI resource configuration-related information defines a group including at least one of a non-zero power (NZP) CSI-RS resource set, a CSI-IM resource set, or a CSI-SSB resource set.

That is, the CSI resource configuration-related information includes a CSI-RS resource set list, and the CSI-RS resource set list may include at least one of a NZP CSI-RS resource set list, a CSI-IM resource set list, or a CSI-SSB resource set list.

The CSI resource configuration-related information may be expressed as CSI-REsourceConfig IE.

The CSI-RS resource set is identified by a CSI-RS resource set ID, and one resource set includes at least one CSI-RS resource.

Each CSI-RS resource is identified by a CSI-RS resource ID.

As shown in Table 4, parameters (e.g.: the BM-related parameter repetition, and the tracking-related parameter trs-Info indicative of (or indicating) a purpose of a CSI-RS may be set for each NZP CSI-RS resource set.

Table 4 shows an example of NZP CSI-RS resource set IE.

TABLE 4

-- ASN1START
-- TAG-NZP-CSI-RS-RESOURCESET-START
NZP-CSI-RS-ResourceSet ::=    SEQUENCE {
    nzp-CSI-ResourceSetId        NZP-CSI-RS-ResourceSetId, TABLE 4-continued

```
    nzp-CSI-RS-Resources            SEQUENCE (SIZE (1..maxNrofNZP-CSI-RS-ResourcesPerSet)) OF NZP-CSI-RS-ResourceId,
    repetition                         ENUMERATED { on, off }
    aperiodicTriggeringOffset       INTEGER(0..4)
    trs-Info                           ENUMERATED {true}
    ...
}
-- TAG-NZP-CSI-RS-RESOURCESET-STOP
-- ASN1STOP
```

In Table 4, the parameter repetition is a parameter indicative of whether to repeatedly transmit the same beam, and indicates whether repetition is set to "ON" or "OFF" for each NZP CSI-RS resource set.

The term "transmission (Tx) beam" used in the present disclosure may be interpreted as the same as a spatial domain transmission filter, and the term "reception (Rx) beam" used in the present disclosure may be interpreted as the same as a spatial domain reception filter.

For example, when the parameter repetition in Table 4 is set to "OFF", a UE does not assume that a NZP CSI-RS resource(s) in a resource set is transmitted to the same DL spatial domain transmission filter and the same Nrofports in all symbols.

In addition, the parameter repetition corresponding to a higher layer parameter corresponds to "CSI-RS-ResourceRep" of L1 parameter.

The CSI report configuration related information includes the parameter reportConfigType indicative of a time domain behavior and the parameter reportQuantity indicative of a CSI-related quantity to be reported.

The time domain behavior may be periodic, aperiodic, or semi-persistent.

In addition, the CSI report configuration-related information may be represented as CSI-ReportConfig IE, and Table 5 shows an example of the CSI-ReportConfig IE.

TABLE 5

```
-- ASN1START
-- TAG-CSI-RESOURCECONFIG-START
CSI-ReportConfig ::=                     SEQUENCE {
    reportConfigId                          CSI-ReportConfigId,
    carrier                                 ServCellIndex                     OPTIONAL, -- Need S
    resourcesForChannelMeasurement          CSI-ResourceConfigId,
    csi-IM-ResourcesForInterference         CSI-ResourceConfigId              OPTIONAL, -- Need R
    nzp-CSI-RS-ResourcesForInterference     CSI-ResourceConfigId              OPTIONAL, -- Need R
    reportConfigType                        CHOICE {
        periodic                                SEQUENCE {
            reportSlotConfig                        CSI-ReportPeriodicityAndOffset,
            pucch-CSI-ResourceList                  SEQUENCE (SIZE (1..maxNrofBWPs)) OF PUCCH-CSI-Resource
        },
        semiPersistentOnPUCCH                   SEQUENCE {
            reportSlotConfig                        CSI-ReportPeriodicityAndOffset,
            pucch-CSI-ResourceList                  SEQUENCE (SIZE (1..maxNrofBWPs)) OF PUCCH-CSI-Resource
        },
        semiPersistentOnPUSCH                   SEQUENCE {
            reportSlotConfig                        ENUMERATED {sl5, sl10, sl20, sl40, sl80, sl160, sl320},
            reportSlotOffsetList                    SEQUENCE (SIZE (1.. maxNrofUL-Allocations)) OF INTEGER(0..32),
            p0alpha                                 P0-PUSCH-AlphaSetId
        },
        aperiodic                               SEQUENCE {
            reportSlotOffsetList                    SEQUENCE (SIZE (1..maxNrofUL-Allocations)) OF INTEGER(0..32)
        }
    },
    reportQuantity                          CHOICE {
        none                                    NULL,
        cri-RI-PMI-CQI                          NULL,
        cri-RI-i1                               NULL,
        cri-RI-i1-CQI                           SEQUENCE {
            pdsch-BundleSizeForCSI                  ENUMERATED {n2, n4}          OPTIONAL
        },
        cri-RI-CQI                              NULL,
        cri-RSRP                                NULL,
        ssb-Index-RSRP                          NULL,
        cri-RI-LI-PMI-CQI                       NULL
    },
```

In addition, the UE measures CSI based on configuration information related to the CSI (S620).

Measuring the CSI may include (1) receiving a CSI-RS by the UE (S621) and (2) computing CSI based on the received CSI-RS (S622).

A sequence for the CSI-RS is generated by Equation 2, and an initialization value of a pseudo-random sequence C(i) is defined by Equation 3.

$$r(m) = \frac{1}{\sqrt{2}}(1 - 2 \cdot c(2m)) + j\frac{1}{\sqrt{2}}(1 - 2 \cdot c(2m+1))$$ [Equation 2]

-continued $$c_{init} = (2^{10}(N_{symb}^{slot}n_{s,f}^{\mu} + l + 1)(2n_{ID} + 1) - n_{ID}) \bmod 2^{31} \quad \text{[Equation 3]}$$

In Equations 2 and 3, $n_{sf}^{\mu}$ is a slot number within a radio frame, and a pseudo-random sequence generator is initialized with Cint at the start of each OFDM symbol where $n_{sf}^{\mu}$ is the slot number within a radio frame.

In addition, l indicates an OFDM symbol number in a slot, and $n_{ID}$ indicates higher-layer parameter scramblingID.

In addition, regarding the CSI-RS, resource element (RE) mapping of CSI-RS resources of the CSI-RS is performed in time and frequency domains by higher layer parameter CSI-RS-ResourceMapping.

Table 6 shows an example of CSI-RS-ResourceMapping IE.

TABLE 6

```
-- ASN1START
-- TAG-CSI-RS-RESOURCEMAPPING-START
CSI-RS-ResourceMapping ::=        SEQUENCE {
    frequencyDomainAllocation      CHOICE {
        row1                           BIT STRING (SIZE (4)),
        row2                           BIT STRING (SIZE (12)),
        row4                           BIT STRING (SIZE (3)),
        other                          BIT STRING (SIZE (6))
    },
    nrofPorts                      ENUMERATED {p1,p2,p4,p8,p12,p16,p24,p32},
    firstOFDMSymbolInTimeDomain    INTEGER (0..13),
    firstOFDMSymbolInTimeDomain2   INTEGER (2..12)
    cdm-Type                       ENUMERATED (noCDM, fd-CDM2, cdm4-FD2-TD2, cdm8-FD2-
TD4},
    density                        CHOICE {
        dot5                           ENUMERATED {evenPRBs, oddPRBs},
        one                            NULL,
        three                          NULL,
        spare                          NULL
    },
    freqBand                       CSI-FrequencyOccupation,
    ...
}
```

In Table 6, a density (D) indicates a density of CSI-RS resources measured in a RE/port/physical resource block (PRB), and nrofPorts indicates the number of antenna ports.

In addition, the UE reports the measured CSI to the base station (S630).

Herein, when a quantity of CSI-ReportConfig in Table 6 is set to "none (or No report)", the UE may skip the reporting.

However, even when the quantity is set to "none (or No report)", the UE may report the measured CSI to the base station.

The case where the quantity is set to "none" is t when an aperiodic TRS is triggered or when repetition is set.

Herein, it may be defined such that reporting by the UE is omitted only when repetition is set to "ON".

To put it briefly, when repetition is set to "ON" and "OFF", a CSI report may indicate any one of "No report", "SSB Resource Indicator (SSBRI) and L1-RSRP", and "CSI-RS Resource Indicator (CRI) and L1-RSRP".

Alternatively, it may be defined to transmit a CSI report indicative of "SSBRI and L1-RSRP" or "CRI and L1-RSRP" when repetition is set to "OFF", it may be defined such that, and to transmit a CSI report indicative of "No report", "SSBRI and L1-RSRP", or "CRI and L1-RSRP" when repetition is "ON".

CSI Measurement and Reporting Procedure

The NR system supports more flexible and dynamic CSI measurement and reporting.

The CSI measurement may include receiving a CSI-RS, and acquiring

CSI by computing the received CSI-RS.

As time domain behaviors of CSI measurement and reporting, aperiodic/semi-persistent/periodic channel measurement (CM) and interference measurement (IM) are supported.

To configure CSI-IM, four port NZP CSI-RS RE patterns are used.

CSI-IM-based IMR of NR has a design similar to CSI-IM of LTE and is configured independent of ZP CSI-RS resources for PDSCH rate matching.

In addition, each port in the NZP CSI-RS-based IMR emulates an interference layer having (a desirable channel and) a pre-coded NZP CSI-RS.

This is about intra-cell interference measurement of a multi-user case, and it primarily targets MU interference.

At each port of the configured NZP CSI-RS-based IMR, the base station transmits the pre-coded NZP CSI-RS to the UE.

The UE assumes a channel/interference layer for each port in a resource set, and measures interference.

If there is no PMI or RI feedback for a channel, a plurality of resources are configured in a set and the base station or network indicates, through DCI, a subset of NZP CSI-RS resources for channel/interference measurement.

Resource setting and resource setting configuration will be described in more detail.

Resource Setting

Each CSI resource setting "CSI-ResourceConfig" includes configuration of S≥1 CSI resource set (which is given by higher layer parameter "csi-RS-ResourceSetList").

Herein, a CSI resource setting corresponds to CSI-RS-resourcesetlist.

Herein, S represents the number of configured CSI-RS resource sets.

Herein, configuration of CSI resource set includes each CSI resource set including CSI-RS resources (composed of NZP CSI-RS or CSI-IM), and a SS/PBCH block (SSB) resource used for L1-RSRP computation.

Each CSI resource setting is positioned at a DL bandwidth part (BWP) identified by higher layer parameter bwp-id.

In addition, all CSI resource settings linked to a CSI reporting setting have the same DL BWP.

In a CSI resource setting included in CSI-ResourceConfig IE, a time domain behavior of a CSI-RS resource may be indicated by higher layer parameter resourceType and may be configured to be aperiodic, periodic, or semi-persistent.

The number S of CSI-RS resource sets configured for periodic and semi-persistent CSI resource settings is restricted to "1".

A periodicity and a slot offset configured for periodic and semi-persistent CSI resource settings are given from a numerology of related DL BWP, just like being given by bwp-id.

When the UE is configured with a plurality of CSI-ResourceConfig including the same NZP CSI-RS resource ID, the same time domain behavior is configured for the CSI-ResourceConfig.

When the UE is configured with a plurality of CSI-ResourceConfig having the same CSI-IM resource ID, the same time domain behavior is configured for the CSI-ResourceConfig.

Then, one or more CSI resource settings for channel measurement (CM) and interference measurement (IM) are configured through higher layer signaling.

A CSI-IM resource for interference measurement.

An NZP CSI-RS resource for interference measurement.

An NZP CSI-RS resource for channel measurement.

That is, a channel measurement resource (CMR) may be an NZP CSI-RS for CSI acquisition, and an interference measurement resource (IMR) may be an NZP CSI-RS for CSI-IM and for IM.

Herein, CSI-IM (or a ZP CSI-RS for IM) is primarily used for inter-cell interference measurement.

In addition, an NZP CSI-RS for IM is primarily used for intra-cell interference measurement from multi-user.

The UE may assume that a CSI-RS resource(s) and a CSI-IM/NZP CSI-RS resource(s) for interference measurement configured for one CSI reporting is "QCL-TypeD" for each resource.

Resource Setting Configuration

As described above, a resource setting may represent a resource set list.

Regarding aperiodic CSI, each trigger state configured using higher layer parameter "CSI-AperiodicTriggerState" is that each CSI-ReportConfig is associated with one or multiple CSI-ReportConfig linked to a periodic, semi-persistent, or aperiodic resource setting.

One reporting setting may be connected to three resource settings at maximum.

When one resource setting is configured, a resource setting (given by higher layer parameter resources-ForChannelMeasurement) is about channel measurement for L1-RSRP computation.

When two resource settings are configured, the first resource setting (given by higher layer parameter resourcesForChannelMeasurement) is for channel measurement and the second resource setting (given by csi-IM-ResourcesForInterference or nzp-CSI-RS-ResourcesForInterference) is for CSI-IM or for interference measurement performed on an NZP CSI-RS.

When three resource settings are configured, the first resource setting (given by resourcesForChannelMeasurement) is for channel measurement, the second resource setting (given by csi-IM-ResourcesForInterference) is for CSI-IM based interference measurement, and the third resource setting (given by nzp-CSI-RS-ResourcesForInterference) is for NZP CSI-RS based interference measurement.

Regarding semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, the first resource setting (given by resourcesForChannelMeasurement) is for channel measurement, and the second resource setting (given by the higher layer parameter "csi-IM-ResourcesForInterference") is used for interference measurement performed on CSI-IM.

CSI computation regarding CSI measurement will be described in more detail.

If interference measurement is performed on CSI-IM, each CSI-RS resource for channel measurement is associated with a CSI-RS resource in a corresponding resource set by an order of CSI-RS resources and CSI-IM resources.

The number of CSI-RS resources for channel measurement is the same as the number of CSI-IM resources.

In addition, when interference measurement is performed on an NZP CSI-RS, the UE is not expected to be configured with one or more NZP CSI-RS resources in an associated resource set within a resource setting for channel measurement.

A UE configured with higher layer parameter nzp-CSI-RS-ResourcesForInterference is not expected to be configured with 18 or more NZP CSI-RS ports in a NZP CSI-RS resource set.

For CSI measurement, the UE assumes the following.

Each NZP CSI-RS port configured for interference measurement corresponds to an interference transmission layer.

Every interference transmission layer of NZP CSI-RS ports for interference measurement considers an energy per resource element (EPRE) ratio.

a different interference signal on a RE(s) of an NZP CSI-RS resource for channel measurement, an NZP CSI-RS resource for interference measurement, or a CSI-IM resource for interference measurement.

A CSI reporting procedure will be described in more detail.

For CSI reporting, time and frequency resources available for an UE are controlled by a base station.

CSI may include at least one of channel quality indicator (CQI), a precoding matrix indicator (PMI), a CSI-RS resource indicator (CRI), am SS/PBCH block resource indicator (SSBRI), a layer indicator (LI), a rank indicator (RI), or L1-RSRP.

Regarding the CQI, the PMI, the CRI, the SSBRI, the LI, the RI, and the L1-RSRP, the UE may be configured with $N \geq 1$ CSI-ReportConfig reporting setting, $M \geq 1$ CSI-ResourceConfig resource setting, and a list of one or two trigger states (provided by aperiodicTriggerStateList and semiPersistentOnPUSCH-TriggerStateList) by a higher layer.

In the aperiodicTriggerStateList, each trigger state includes a channel and a list of associated CSI-ReportConfigs selectively indicative of Resource set IDs for interference.

In the semiPersistentOnPUSCH-TriggerStateList, each trigger state includes one associated CSI-ReportConfig.

In addition, a time domain behavior of CSI reporting supports periodic, semi-persistent, and aperiodic CSI reporting.

Hereinafter, periodic, semi-persistent, and aperiodic CSI reporting will be described.

The periodic CSI presorting is performed on a short PUCCH and a long PUCCH.

A periodicity and a slot offset of the periodic CSI reporting may be configured by RRC and refer to CSI-Report-Config IE.

Then, SP CSI reporting is performed on a short PUCCH, a long PUCCH, or a PUSCH.

In the case of SP CSI on a short/long PUCCH, a periodicity and a slot offset are configured by RRC, and CSI reporting to an additional MAC CE is activated/deactivated In the case of SP CSI on a PUSCH, a periodicity of SP CSI reporting is configured by RRC, but a slot offset thereof is not configured by RRC and SP CSI reporting is activated/deactivated by DCI (format 0_1).

The first CSI reporting timing follows a PUSCH time domain allocation value indicated by DCI, and subsequent CSI reporting timing follows a periodicity which is configured by RRC.

For SP CSI reporting on a PUSCH, a separated RNTI (SP-CSI C-RNTI) is used.

DCI format 0_1 may include a CSI request field and activate/deactivate a specific configured SP-CSI trigger state.

In addition, SP CSI reporting is activated/deactivated identically or similarly to a mechanism having data transmission on a SPS PUSCH.

Next, aperiodic CSI reporting is performed on a PUSCH and triggered by DCI.

In the case of AP CSI having an AP CSI-RS, an AP CSI-RS timing is configured by RRC.

Herein, a timing of AP CSI reporting is dynamically controlled by DCI.

A reporting method (e.g., transmitting in order of RI, WB, PMI/CQI, and SB PMI/CQI) by which CSI is divided and reported in a plurality of reporting instances, the method which is applied for PUCCH-based CSI reporting in LTE, is not applied in NR.

Instead, NR restricts configuring specific CSI reporting on a short/long PUCCH, and a CSI omission rule is defined.

Regarding an AP CSI reporting timing, PUSCH symbol/slot location is dynamically indicated by DCI. In addition, candidate slot offsets are configured by RRC.

Regarding CSI reporting, a slot offset(Y) is configured for each reporting setting.

Regarding UL-SCH, a slot offset K2 is configured separately.

Two CSI latency classes (low latency class and high latency class) are defined in terms of CSI computation complexity.

The low latency CSI is WB CSI that includes up to 4-ports Type-I codebook or up to 4-ports non-PMI feedback CSI.

The high latency CSI is a CSI other than the low latency CSI.

Regarding a normal UE, (Z, Z') is defined in a unit of OFDM symbols.

Z represents the minimum CSI processing time after receiving CSI triggering DCI and before performing CSI reporting.

Z' represents the minimum CSI processing time after receiving CSI-RS about a channel/interference and before performing CSI reporting Additionally, the UE reports the number of CSI which can be calculated at the same time.

A-CSI or AP CSI used in the present specification indicates aperiodic CSI which is the CSI reported aperiodically by the UE.

Also, CSI report or CSI reporting used in the present specification may be regarded to have the same meaning.

To inform of UE capability for A-CSI computation or calculation time, the UE reports a set of supported Z values and CSI configuration which may be supported for each Z value to the eNB.

Here, Z is defined by the minimum required number of symbols for CSI computation for a given CSI configuration.

More specifically, Z refers to the minimum amount of time required for calculation related to AP CSI processing, such as decoding time, channel measurement, CSI calculation, and TX preparation.

A CSI configuration includes information indicating wideband (WB) only CSI or sub-band (SB) and WB CSI; information about the maximum number of CSI-RS ports; and information about type 1 codebook or type 2 codebook.

When the UE supports a plurality of numerology, the information about CSI may be reported for each numerology.

When an A-CSI report is triggered at slot n on the PUSCH, the UE drops the A-CSI report for the following cases:

A case where the time gap between the last symbol of the PDCCH and the start symbol of the PUSCH in the slot n is smaller than a reported value of Z with respect to a given CSI configuration and A case where an AP CSI-RS resource is transmitted from the slot n, and the time gap between the last symbol of a CSI-RS resource and the start symbol of the PUSCH is smaller than a reported value of Z with respect to a given CSI configuration.

And those symbols between the Z symbols before the start symbol of the PUSCH and the start symbol of the PUSCH are not valid as (CSI) reference resources.

In what follows, an A-CSI report trigger and a CSI report related thereto will be described.

When the eNB triggers an A-CSI report through downlink control information (DCI) transmission in the slot n, the UE operates as follows.

A-CSI is transmitted by the UE through the PUSCH allocated as a resource by the DCI.

The transmission timing of the PUSCH is indicated by a specific field (which is defined as a Y value) of the DCI.

More specifically, the PUSCH is transmitted from the (n+Y)-th slot (slot n+Y) with reference to the slot n which corresponds to the trigger time of the A-CSI report.

For example, when a DCI field for the Y value is defined by 2 bits, the Y value for 00, 01, 10, and 11 is defined respectively by RRC signaling and more specifically, defined within a report setting defined through RRC signaling.

The report setting may also be expressed by reporting setting or CSI-ReportConfig.

An A-CSI report trigger may trigger one or more specific report settings, and the value of 00, 01, 10, and 11 of the DCI field is defined according to the Y value defined within the triggered report setting.

As described above, when the time gap or timing gap between the last symbol of the PDCCH and the start symbol of the PUSCH is smaller than the Z value corresponding to the CSI configuration of triggered A-CSI, the UE transmits the triggered A-CSI to the eNB without dropping or updating the A-CSI.

Since the amount of time allocated for actual calculation is smaller than the minimum amount of time Z required for calculation of the A-CSI, the UE is unable to calculate the A-CSI.

As a result, the UE does not drop or update triggered CSI.

When a Non-Zero Power (NZP) CSI-RS or Zero Power (ZP) CSI-RS used for channel estimation or interference estimation of triggered A-CSI is an aperiodic CSI-RS, the UE estimates a channel or interference through one shot measurement from the corresponding RS.

In other words, it indicates that the UE estimates a channel or interference by using the corresponding RS (NZP CSI-RS or ZP CSI-RS) only.

At this time, if the time gap between the very last symbol of a CSI-RS resource and the start symbol of the PUSCH is smaller than the Z value corresponding to the CSI configuration of triggered A-CSI, in the same way as the UE's operation described above, the UE transmits the corresponding A-CSI to the eNB without dropping or updating the corresponding A-CSI.

And when the UE calculates CSI, the UE does so by assuming reception of data for a specific frequency and/or time resource area, which is called a CSI reference resource.

The CSI reference resource may be simply referred to as a reference resource.

Since the UE starts CSI calculation from the CSI reference resource time, the UE may calculate CSI only when the amount of time as long as Z symbols from the CSI reference resource time is secured.

Therefore, the reference resource time has to be defined at least before z symbols (or z+1 symbols) with respect to the CSI report time.

To this end, when validity of a reference resource is checked, symbols or slots before at least z symbols (or z+1 symbols) are determined to be valid with respect to the CSI report time, but invalid, otherwise.

Here, the (CSI) reference resource is defined in units of slots.

Also, the slot whose number is less than or equal to $n-n_{CQI\_REF}$ (namely slot $n-n_{CQI\_REF}$) is determined as the (CSI) reference resources with reference to the slot for CSI reporting (for example, slot n).

The statement above, which says that 'symbols or slots before at least z symbols (or z+1 symbols) are determined to be valid with respect to the CSI report time, but invalid, otherwise', may indicate that $n_{CQI\_REF}$ is configured by Eq. 4 below.

$$n_{CQI\_REF} = \text{floor}\left(\frac{z}{\text{The number of } OFDM \text{ symbols comprising one slot}}\right) + 1 \quad [\text{Eq. 4}]$$

In Eq. 4, floor discards digits after the decimal point and is denoted by a symbol $\lfloor \cdot \rfloor$.

The UE sets the most recent slot which satisfies the validity condition for a reference resource among slots whose number is less than or equal to $n-n_{CQI\_REF}$ as a reference resource.

Similarly, the UE may simply set the slot $n-n_{CQI\_REF}$ as the reference resource.

And the time offset of the CSI reference resource may be determined on the basis of the proposal 3 to be described later, and detailed descriptions about how the time offset of the CSI reference resource is determined will be given by the proposal 3.

The A-CSI report trigger field included in the DCI may be interpreted as follows.

When an eNB instructs a UE to perform an A-CSI trigger for a plurality of report settings simultaneously, and a definition of the Y value is different for each report setting, a problem occurs as described below, and a UE operation to solve the problem through various methods will be described.

For example, suppose a report setting 1 is defined as Y={0, 1, 2, 3}, and a report setting 2 is defined as Y={1, 2, 3, 4}.

In this case, an ambiguity occurs in which value the (2 bits) DCI field indicating the Y value has to be interpreted.

Therefore, to remove the ambiguity, it is proposed that the UE operates according to the following methods.

(Method 1)

The UE newly generates Y' as an intersection between two different Ys and interprets the DCI field according to the Y' value.

In other words, in the example above, the intersection of two different Ys is {1, 2, 3}, and the UE interprets 00, 01, 10, and 11 of the DCI field as 1, 2, 3, and 3, respectively.

If the intersection between two different Ys is {1}, the UE interprets 00, 01, 10, and 11 as 1, 1, 1, and 1, respectively.

If the intersection between two different Ys is {1, 2}, the UE interprets 00, 01, 10, and 11 as 1, 2, 2, and 2.

In the example above, when the number of elements belonging to the intersection between two different Ys is smaller than the states (for example, 00, 01, 10, and 11) of the DCI field, the remaining states are defined by repeating the last intersection value.

However, different from the definition above, the remaining states may be defined as reserved.

(Method 2)

The UE interprets the DCI field according to the Y value defined in one of a plurality of report settings.

For example, among a plurality of report settings, the UE interprets the DCI field by using the Y value for a report setting having a low report setting index.

Similarly, among a plurality of report setting, the UE interprets the DCI field by using the Y value for a report setting having a low index for a component carrier (CC).

The UE puts priorities between the report setting index and the CC index and determines a Y value for a report setting by using the CC index.

If the CC index is the same, the UE may then determine the Y value according to the report setting index.

Or as described above, the priority may be reversed (a high priority is set for the report setting index).

(Method 3)

The UE may expect that a plurality of report settings always have the same Y value.

In other words, the eNB configures the report settings 1 and 2 to have the same Y value through RRC signaling.

For example, the eNB may configure the report setting 1 by using Y={1, 2, 3, 4} and the report setting 2 by using Y={1, 2, 3, 4}.

(Method 4)

The UE determines the time offset of aperiodic CSI reporting by using the larger value of two different Y values.

For example, the report setting 1 may be defined by Y1={0, 1, 2, 3}, and the report setting 2 may be defined by Y2={1, 2, 3, 4}.

When the DCI field for Y (for example, 2 bits) is '00', Y1=0, and Y2=1; and therefore, the Y value is determined by '1' which is the larger of the two values.

When the DCI field for Y (for example, 2 bits) is '01', Y1=1, and Y2=2; and therefore, the Y value is determined by '2' which is the larger of the two values.

The Y value may be defined in the same way as above when the DCI field value is '10' and '11', and the Y value for the DCI field value of '10' and '11' is determined as '3' and '4', respectively.

If three Y values are defined, the largest one among the three values may be determined as a time offset by applying the same method as described above.

As described above, the eNB may instruct the UE to perform an AP CSI reporting trigger through one DCI and determine the time offset of aperiodic CSI reporting according to the methods described above (Methods 1 to 4) by using the Y values defined for the respective N triggered AP CSI reporting settings.

In addition, the eNB may indicate the data transmission time through the PUSCH while performing an AP CSI reporting trigger through the same DCI simultaneously.

At this time, the data transmission time through the PUSCH is defined as a 'K2' value, and a plurality of candidate sets are set to the UE through upper layer signaling in advance.

One of the candidate sets is determined (or selected) as a final K2 value through the DCI field (which is also called a 'timing offset field').

Also, the DCI field for selecting the K2 value and the DCI field for selecting the Y value are not defined by separate fields but are defined by the same DCI

FIELD

When an AP CSI reporting trigger occurs, the UE uses the corresponding DCI field to select the Y value, and when scheduling of PUSCH data is occurred, the corresponding DCI field is used to select the K2 value.

When PUSCH data scheduling occurs while an AP CSI reporting trigger is performed simultaneously through the DCI, an ambiguity arises about whether to define each value of the timing offset field as a candidate of the Y value or a candidate for the K2 value.

To solve the ambiguity, it is possible to directly extend and apply the aforementioned methods (Methods 1 to 4).

In other words, the proposed methods (Methods 1 to 4) above are related to how to define the value of the timing offset field when a plurality of Y candidate sets are given, and Methods 1 to 4 may also be applied to the K2 candidate set by treating the K2 candidate set as one Y candidate set.

For example, Method 4 may be extended and applied as described below.

The UE defines the timing offset field by using the larger of different Y and K2 values.

For example, suppose a report setting 1 is defined as Y1={0, 1, 2, 3}, and a report setting 2 is defined as K2={3, 4, 5, 6}.

If the DCI field of the timing offset is '00', Y1=0, Y2=1, and K2=3; and therefore, the timing offset field is determined by the largest value '3'.

If the DCI field is '01', Y1=1, Y2=2, and K2=4; and therefore, the timing offset field is determined by the largest value '4'.

The DCI field values for '10' and '11' may be determined in the same manner, and in this case, the DCI field values for '10' and '11' are determined as '5' and '6', respectively.

The UE may multiplex PUSCH data and CSI in the slot (n+timing offset) with respect to the slot n which has received DCI according to an indicated DCI value and report (or transmit) the multiplexed data and CSI to the eNB simultaneously.

Now, other methods for interpreting the A-CSI report trigger-related DCI field in addition to the aforementioned methods (Methods 1 to 4) will be described.

(Method 5)

In another method, the UE constructs a union set by combining candidate sets of different Ys and K2 candidate sets and defines the value of an n bit timing offset DCI field as the values ranging from the largest element to the 2n-th largest element of the union set.

The UE multiplexes PUSCH data and CSI in the slot (n+timing offset) with respect to the slot n which has received DCI according to an indicated DCI value and reports (or transmits) the multiplexed data and CSI to the eNB simultaneously.

(Method 6)

In yet another method, after constructing one set from candidate sets of Ys through the Methods 1 to 4, a union set is constructed by combining one of the Y candidate sets and a candidate set of K2.

And the DCI field value of an n bit timing offset is defined by the values ranging from the largest element to the 2n-th largest element of the union set.

(Method 7)

Method 7 constructs one set from candidate sets of Ys through the Methods 1 to 4 and defines the i-th value of the DCI field of the timing offset by using a sum of the i-th element of one of the Y candidate sets and the i-th element of the K2 candidate sets.

For example, when the Y candidate set is {1, 2, 3, 4}, and the K2 candidate set is {5, 6, 7, 8}, the respective values of the 2-bit timing offset DCI field for 00, 01, 10, and 11 may be defined by 1+5 (6), 2+6 (8), 3+7 (10), and 4+8 (12).

(Method 8)

Method 8 constructs one set from candidate sets of Ys through the Methods 1 to 4 and defines the i-th value of the timing offset DCI field as a sum of the i-th element of the candidate set of Ys while ignoring the candidate set of K2.

Next, a relaxation method for AP CSI calculation will be described.

The UE reports a Z value as defined below to the eNB by using one of capabilities of the UE for AP CSI calculation.

By assuming CSI only PUSCH (no HARQ ACK/NACK) for a given numerology and CSI complexity, Z is defined as the minimum required number of symbols for PDCCH detection/decoding time for receiving DCI triggering a CSI report, channel estimation time, and CSI calculation time.

For low complexity CSI, one Z value for a given numerology is defined as shown in Table 7 below.

And for high complexity CSI, one Z value for a given numerology is defined as shown in Table 7 below.

TABLE 7

| CSI complexity | Units | 15 kHz SCS | 30 kHz SCS | 60 kHz SCS | 120 kHz SCS |
| --- | --- | --- | --- | --- | --- |
| Low complexity CSI | Symbols | $Z_{1,1}$ | $Z_{1,2}$ | $Z_{1,3}$ | $Z_{1,4}$ |

TABLE 7-continued

| CSI complexity | Units | 15 kHz SCS | 30 kHz SCS | 60 kHz SCS | 120 kHz SCS |
|---|---|---|---|---|---|
| High complexity CSI 1 | Symbols | $Z_{2,1}$ | $Z_{2,2}$ | $Z_{2,3}$ | $Z_{2,4}$ |
| High complexity CSI 2 | Symbols | $Z_{N+1,1}$ | $Z_{N+1,2}$ | $Z_{N+1,3}$ | $Z_{N+1,4}$ |

As described above, Z is defined as a sum of the amount of time required for DCI decoding (which means decoding time of DCI holding AP CSI trigger information), the amount of time required for channel estimation, and the amount of time required for CSI calculation.

According to the complexity of CSI triggered with respect to the Z value, the eNB indicates a Y value (in other words, according to whether it is low complexity CSI or high complexity CSI).

If it is assumed that DCI holding an AP CSI trigger (namely AP CSI triggering DCI) is transmitted to slot n, the UE reports the corresponding CSI to the eNB at slot (n+timing offset Y).

If the time allocated to the UE for CSI calculation is insufficient for the UE's capability for AP CSI calculation, the UE, instead of updating (or calculating) CSI, transmits the most recently reported CSI or arbitrary CSI (or pre-defined, specific CSI, for example, CQI=0, PMI=0, and RI=1) to the eNB.

FIG. 7 illustrates the aforementioned situation. In other words, FIG. 7 illustrates timing at which a periodic CSI-RS is received.

More specifically, FIG. 7 illustrates a situation in which the most recent periodic (P) CSI-RS which has been received at or before reference resource time exists within a T time period.

In FIG. 7, the UE measures CSI through a periodic CSI-RS (P CSI-RS), and it may be noticed that the P CSI-RS and the CSI reference resource exist within the time T.

In this case, within the time T, the UE performs all of DCI decoding, channel estimation, and CSI calculation.

Therefore, the UE compares T and Z and if T<Z, does not calculate (or update) CSI but transmits the most recently reported CSI or arbitrary CSI.

If T>=Z, the UE calculates CSI on the basis of the periodic CSI-RS and reports the calculated CSI to the eNB.

FIGS. 8 and 9 illustrate another example of the timing at which a period CSI-RS is received.

In other words, FIGS. 8 and 9 illustrate a situation in which the most recent P CSI-RS received at or before the reference resource time exists before the T period.

Or, FIGS. 8 and 9 illustrate a situation in which a P CSI-RS does not exist within the T period, but the P CSI-RS exists before the T period.

In other words, referring to FIGS. 8 and 9, the UE has already performed channel measurement from a (periodic) CSI-RS before a CSI report trigger is occurred.

Therefore, in this case, the UE performs DCI decoding and CSI calculation within the T period.

The UE compares T and Z−(channel estimation time) and if T<Z−(channel estimation time), does not calculate (or update) CSI but transmits the most recently reported CSI or arbitrary CSI to the eNB.

Here, the UE may report the channel estimation time to the eNB by using separate capability.

If T>=Z−(channel estimation time), the UE calculates CSI and reports the calculated CSI to the eNB.

Here, Z−(channel estimation time) may be defined by a third variable Z', and the UE may report Z and Z' to the eNB, respectively.

FIG. 10 illustrates one example of a method for measuring CSI by using an AP CSI-RS.

First, an AP CSI-RS is defined to exist always within the time period T.

In this case, within the time T, the UE performs all of DCI decoding, channel estimation, and CSI calculation.

Therefore, the UE compares T and Z and if T<Z, does not calculate (or update) CSI but transmits the most recently reported CSI or arbitrary CSI.

If T>=Z, the UE calculates CSI and reports the calculated CSI to the eNB.

FIG. 11 illustrates one example of another method for measuring CSI by using an AP CSI-RS.

More specifically, FIG. 11 illustrates a situation in which an AP CSI-RS is transmitted long after the UE finishes decoding of DCI.

In this case, the UE has to perform all of DCI decoding, channel estimation, and CSI calculation within the time period T.

However, since an AP CSI-RS is transmitted long after DCI decoding is finished, the UE is unable to perform channel measurement and CSI calculation during the time period T until the DCI decoding is finished and the AP CSI-RS is transmitted.

Therefore, the UE compares T and Z and if T<Z, does not calculate (or update) CSI but may transmit the most recently reported CSI or arbitrary CSI to the eNB; however, if T>=Z, the UE is unable to calculate CSI and thus unable to report CSI to the eNB.

Therefore, to make the method as shown in FIG. 11 effective, the eNB has to transmit an AP CSI-RS within the DCI decoding time after the last OFDM symbol of triggering DCI.

Or the eNB has to transmit an AP CSI-RS before Z−(decoding time) at the first OFDM symbol from which AP CSI is reported.

The UE may report the decoding time to the eNB through separate capability.

Here, Z−(decoding time) may be defined as a third variable Z', and the UE may report Z and Z' to the eNB, respectively.

In other words, T' between the time at which the AP CSI-RS used for channel measurement or interference measurement is last received and the start time at which CSI is reported is smaller than Z', the UE determines that time for calculating CSI is not sufficient and does not calculate CSI.

Therefore, the UE does not report valid CSI but reports a predefined dummy CSI value (for example, RI=1, PMI=1, and CQI=1) to the eNB.

Or if T' between the last OFDM symbol on which the AP CSI-RS is transmitted and the first OFDM symbol on which the AP-CSI is reported is smaller than Z−(decoding time), the UE does not calculate (or update) CSI but transmits the most recently reported CSI or arbitrary CSI to the eNB.

And if T'>=Z−(decoding time), and T<Z, the UE does not calculate (or update) CSI but transmits the most recently reported CSI or arbitrary CSI.

If T'>=Z−(decoding time) and T>=Z, the UE calculates CSI and reports the calculated CSI to the eNB.

The UE may report the decoding time to the eNB through separate capability.

Differently from the proposals to be described later, if Z' is introduced, the Z in the proposals 2 and 3 may be replaced with the Z'.

As described above, the Z indicates the minimum required time for all of the calculations related to AP CSI processing such as DCI decoding time, channel measurement, CSI calculation, and TX preparation.

And the Z' indicates the minimum required time for channel measurement, CSI calculation, and TX preparation.

Therefore, it may be preferable to set the time provided for the UE, spanning from the last reception time of the CSI-RS used for channel measurement or interference measurement to the start time at which the CSI is transmitted, with reference to the Z' which does not include decoding time.

The proposals 2 and 3 below may be limited (or restricted) to the case where CSI is reported within a short time period after the A CSI report triggering.

For example, the proposals 2 and 3 to be described later may be applied only to the case of a small Y value such as Y=0 (or Y=1).

If Y=0, it may be related to the operation for self-contained CSI feedback which is operated in one slot, including CSI report triggering, channel measurement, and up to CSI reporting.

For the self-contained structure, the descriptions given above may be referenced.

To this purpose, a reference resource is defined to be as close as possible from slot n, and the UE is made to measure a channel by using a CSI-RS within a time period between CSI report triggering and CSI reporting.

Or even if Y is a non-zero, small value (for example, Y=1), since the eNB is intended to trigger CSI reporting and to receive a fresh (or new) CSI report within a short time period, a reference resource may be defined to be as close as possible from slot n, and the eNB may be made to perform channel measurement by using a fresh CSI-RS close to the CSI reporting time.

On the other hand, if Y is a large value, since it already takes a long time from a triggering time to the report time, the time at which a CSI-RS measures a channel does not cause a critical problem compared to the case where Y is small.

Therefore, in this case, the proposal 3 to be described later is not applied but the time offset of the reference resource is configured by one of the following options.

First, the option 1 is described.

When a P/SP/AP CSI-RS is used to calculate CSI for A-CSI reporting, the time offset of a CSI reference resource is derived from the Z value with respect to a given CSI latency and numerology as described below.

In other words, $n_{CQI\_ref}$ is the same as $\lceil Z/N_{symb}^{slot} \rceil$ or is the smallest value greater than or equal to $\lceil Z/N_{symb}^{slot} \rceil$, such that slot $n-n_{CQI\_ref}$ corresponds to a valid downlink slot.

The description above may be applied to P/SP CSI reporting in the same way.

Next, the option 2 will be described.

When a P/SP/AP CSI-RS is used to calculate CSI for A-CSI reporting, the time offset of a CSI reference resource is derived from the Z value with respect to a given CSI latency and numerology as described below.

$n_{CQI\_ref}$ is the same as $\lceil Z/N_{symb}^{slot} \rceil+1$ or is the smallest value greater than or equal to $\lceil Z/N_{symb}^{slot} \rceil+1$, such that slot $n-n_{CQI\_ref}$ corresponds to a valid downlink slot.

The description above may be applied to P/SP CSI reporting in the same way.

In the case of the option 2, the reference resource does not at all include symbols before 0, 1, 2, 3, . . . , Z symbols at the CSI report start time.

According to the current standard, since channel measurement or interference measurement is not allowed to be performed after the reference resource, only the option 2 already satisfies the condition of the proposal 2.

Next, particulars related to aperiodic CSI report timing and CSI relaxation will be described briefly.

Candidates of CSI calculation time Z are defined in Table 7 above.

While CSI is transmitted only on the PUSCH, if A-CSI reporting is triggered on slot n, the UE doesn't have to update the CSI with respect to A-CSI reporting for the following cases:

The case where M-L-N<Z for given CSI complexity and numerology and

The case where an AP CSI-RS resource is transmitted on slot n for given CSI complexity and numerology, and M-O-N<Z.

Here, L represents the last symbol of the PDCCH on slot n, M represents the start symbol of the PUSCH, and N represents the TA value (for example, TA=1.4 symbol) in units of symbols.

And O represents a later symbol between the last symbol of the AP CSI-RS resource for a channel measurement resource (CMR) and the last symbol of the AP CSI-RS resource for an interference measurement resource (IMR).

And the PUSCH timing offset for A-CSI reporting may be determined as follows.

When the PUSCH is scheduled only for a single A-CSI report, the DCI field for the PUSCH timing offset is defined from the Y in a report setting.

And when the PUSCH is scheduled only for a plurality of A-CSI reports, the DCI field for the PUSCH timing offset is defined as the maximum value among various Y values in the report setting.

For example, when Y={1, 2, 3, 6} in a report setting 1, and Y={2, 3, 4, 5} in a report setting 2, Y may be defined as Y={2, 3, 4, 6}.

Other particulars defined in the standard will be described.

The terms of low complexity CSI and high complexity CSI may be replaced with low latency CSI and high latency CSI, respectively.

Two CSI latency classes are supported for CSI computation capability.

The low latency CSI class is defined as WB CSI including a maximum of four antenna ports, which may be applied only when a Type-I codebook or PMI is not configured.

The high latency CSI class is defined as a superset of all of CSI supported by the UE, and the descriptions given above are not applied to L1 RSRP.

And when CSI is transmitted through the PUSCH, a start and length indicator value (SLIV) and PUSCH mapping type are determined by pusch-symbolAllocation in the same way as in the PUSCH without CSI.

The PUSCH slot offset when CSI is multiplexed with the UL-SCH on the PUSCH is determined solely by the K2 value indicated by pusch-symbolAllocation rather than aperiodicReportSlotOffset.

The descriptions given above are applied only for the case where CSI is multiplexed with data.

Here, the numbers of candidate values for the aperiodicReportSlotOffset and K2 are the same with each other.

Particulars related to the A-CSI reporting will be further described.

The condition for when the UE does not need to update CSI for A-CSI reporting will be described again on the basis of the descriptions give above.

First, an A-CSI report trigger with respect to a plurality of CSI will be described with the A-CSI report trigger with respect to single CSI in mind.

FIG. 12 illustrates one example of an A-CSI report trigger for single CSI proposed by the present specification.

More specifically, FIG. 12 illustrates an example of an A-CSI report trigger with respect to single CSI, where a periodic CSI-RS and a CSI reference resource exist within a time window T.

In this case, the UE has to perform DCI decoding, channel estimation, CSI calculation, and Tx preparation within the time window T.

Therefore, when T<Z, the UE does not need to update the CSI.

FIG. 13 illustrates one example of an A-CSI report trigger for single CSI having a periodic CSI-RS proposed by the present specification.

(Proposal 1)

In the case of an A-CSI report trigger for single CSI, the UE does not update the CSI when T<Z.

Here, T is a time duration between the reception time of the last OFDM symbol of triggering DCI and the transmission time of the first OFDM symbol of AP CSI reporting.

Different from FIG. 12, even though T>Z, FIG. 13 illustrates the case in which the P CSI-RS and the reference resource come late in the time window T.

In this case, even though T>Z, the UE is unable to complete CSI calculation since it starts channel estimation too late.

Therefore, to prevent such a case from happening, the UE has to perform channel/interference measurement at the ZP/NZP CSI-RS at which at least Z symbols are located before the first OFDM symbol of the AP CSI report.

(Proposal 2)

The UE does not need to measure channel or interference through the ZP/NZP CSI-RS received from 0 to Z symbols before the transmission time of the first OFDM symbol of the AP CSI report.

The time offset of the CSI reference resource has to be derived properly from Z so that it matches the proposal 2.

FIGS. 14 and 15 illustrate examples of a method for determining a time offset of a CSI reference resource proposed by the present specification.

More specifically, FIGS. 14 and 15 illustrate two options for determining a time offset where Z=5, $N_{symb}^{slot}$=14, and a CSI report starts at the 10-th symbol of slot n.

FIG. 14 illustrates one example of valid CSI-RS locations for CSI reference resource and channel measurement when $n_{CQI\_ref}=\lceil Z/N_{symb}^{slot}\rceil$.

In FIG. 14, since the reference resource is slot n−1, the UE is unable to use a potential CSI-RS resource at 1, 2, 3, or 4 symbol of slot n for channel measurement.

The UE measures the channel from a CSI-RS at one or a few slots before the slot n.

However, this operation incurs too much delay between channel measurement and CSI report.

As a result, self-contained A-CSI feedback which is performed in the same single slot in which CSI triggering, channel measurement, and CSI report are conducted may not be supported.

To solve the aforementioned problem, as shown in FIG. 15, $n_{CQI\_ref}$ may be defined as $\lfloor Z/N_{symb}^{slot}\rfloor$.

In other words, FIG. 15 illustrates another example of valid CSI-RS locations for CSI reference resource and channel measurement when $n_{CQI\_ref}=\lfloor Z/N_{symb}^{slot}\rfloor$.

In FIG. 15, the reference resource is slot n, and the slot n includes a few symbols beyond Z.

As a result, when the CSI-RS is transmitted on the 1st, 2nd, 3rd, or 4th symbol of the slot n, the UE may measure the channel by using the transmitted CSI-RS and calculate the CSI from the new channel measurement.

(Proposal 3)

When the P/SP/AP CSI-RS is used for CSI calculation for A-CSI reporting, the time offset of the CSI reference resource is derived from the Z value with respect to the CSI latency and numerology as given below.

Here, $n_{CQI\_ref}$ is the smallest value greater than or equal to $\lfloor Z/N_{symb}^{slot}\rfloor$, such that slot n-$n_{CQI\_ref}$ corresponds to a valid downlink slot.

Here, a specific slot may be regarded as a valid downlink slot when the following conditions are satisfied:

When the specific slot includes a downlink or a flexible symbol set on at least one upper layer, When the specific slot is not located within a measurement gap set for the UE, When the active DL BWP in a slot is the same as the DL BWP for which CSI report is conducted, and When at least one CSI-RS transmission occasion for channel measurement and CSI-RS for interference measurement and/or CSI-IM occasion is located in the DRS active time no later than the CSI reference resource in which the CSI report is conducted.

The description above may be applied to the P/SP CSI reporting in the same way.

When an AP CSI-RS is transmitted, a problem similar to what has been described with reference to FIG. 13 may occur, which will be described with reference to FIG. 16.

As shown in FIG. 13, it may be seen that the AP CSI-RS comes late in the time window T.

In this case, even though T>Z, the UE is unable to complete CSI calculation since it starts channel estimation too late.

A simple method to solve this problem is to compare T' and Z instead of T and Z.

Here, T' represents a time gap between the most recent AP CSI-RS reception time and transmission time of the first OFDM symbol of the AP CSI report.

In particular, if T'<Z, the UE updates CSI and does not have to report the lowest CQI.

In the case which requires more precise mechanism, Z' which is smaller than Z is defined, and instead of T' and Z, T' and Z' may be compared.

In other words, Z' indicates the amount of time required for channel measurement, CSI calculation, and TX preparation except for DCI decoding.

Z indicates the time which includes DCI decoding in addition to the channel measurement, CSI calculation, and TX preparation.

However, since the decoding time of DCI doesn't necessarily have to be considered in the T', the time actually required for the T' may be smaller than Z.

If sufficient time is not provided for T', the UE does not have measurement of a channel under consideration, and thus the UE may report the lowest CQI in a specific UCI field.

FIG. 16 illustrates one example of an A-CSI report trigger for single CSI having an aperiodic CSI-RS proposed by the present specification.

(Proposal 4)

In the case of A-CSI report trigger for single CSI which uses an AP CSI-RS, if T'<Z, the UE does not need to calculate CSI and reports the lowest CQI.

Here, T' represents a time duration between the most recent CSI-RS reception time and the transmission time of the first OFDM symbol for AP CSI report.

In the case of A-CSI report trigger for a plurality of N CSI, if the UE is equipped with N parallel processors, the UE may use the same mechanism as in the single CSI trigger.

However, if more than N CSI is triggered, the UE is unable to complete calculation of all of the triggered CSI.

In this case, a CSI relaxation method supported by the LTE system may be used again.

(Proposal 5)

In other words, the proposal 5 reuses a relaxation method supported by the LTE system in the case of an A-CSI report trigger for a plurality of CSI.

Now, UE capability for CSI calculation will be described.

According to the proposals 1 to 3 described above, the amount of time required for CSI processing is determined, which may be summarized as shown in Tables 8 and 9.

In other words, Table 8 provides Z values for normal UEs, which are reference values that have to be supported by all of the UEs.

And Table 9 provides Z values for advanced UEs; therefore, for a given numerology and CSI latency, UE capability is employed to report whether to support the Z values of Table 9.

Also, for the given numerology and CSI latency, the Z values of Table 9 have to be the same as or smaller than the Z values of Table 8.

Also, the value of $Z'_{i,j}$ needs to be added with respect to Z'.

The $Z'_{i,j}$ value represents a required time duration between the reception time of the most recent CSI-RS and the transmission time of the first OFDM symbol of the AP CSI report.

Table 8 illustrates one example of the CSI calculation time Z for normal UEs.

TABLE 8

| CSI complexity | Units | 15 kHz SCS | 30 kHz SCS | 60 kHz SCS | 120 kHz SCS |
|---|---|---|---|---|---|
| Low latency CSI | Symbols | $Z_{1,1}$ | $Z_{1,2}$ | $Z_{1,3}$ | $Z_{1,4}$ |
| High latency CSI | Symbols | $Z_{2,1}$ | $Z_{2,2}$ | $Z_{2,3}$ | $Z_{2,4}$ |

Table 9 illustrates one example of CSI calculation time Z for advanced UEs.

TABLE 9

| CSI complexity | Units | 15 kHz SCS | 30 kHz SCS | 60 kHz SCS | 120 kHz SCS |
|---|---|---|---|---|---|
| Low latency CSI | Symbols | $Z_{1,1}$ | $Z_{1,2}$ | $Z_{1,3}$ | $Z_{1,4}$ |

TABLE 9-continued

| CSI complexity | Units | 15 kHz SCS | 30 kHz SCS | 60 kHz SCS | 120 kHz SCS |
|---|---|---|---|---|---|
| High latency CSI | Symbols | $Z_{2,1}$ | $Z_{2,2}$ | $Z_{2,3}$ | $Z_{2,4}$ |

The proposals described above are summarized briefly as follows.

First, according to the proposal 1, if T<Z for an A-CSI report trigger with respect to single CSI, the UE doesn't need to update CSI.

Here, T represents a time duration between the reception time of the last OFDM symbol of triggering DCI and the transmission time of the first OFDM symbol of AP CSI reporting.

And according to the proposal 2, the UE doesn't need to measure a channel or interference due to a ZP/NZP CSI-RS received from 0 to Z symbols before the transmission time of the first OFDM symbol of AP CSI reporting.

And according to the proposal 3, when a P/SP/AP CSI-RS is used to conduct CSI calculation for A-CSI reporting, the time offset of a CSI reference resource is derived from Z with respect to the given CSI latency and numerology as follows.

In other words, $n_{CQI\_ref}$ is the smallest value greater than or equal to $\lfloor Z/N_{symb}^{slot} \rfloor$, such that slot $n-n_{CQI\_ref}$ corresponds to a valid downlink slot. This property may be applied in the same way to P/SP CSI reporting.

And according to the proposal 4, in the case of an A-CSI report trigger with respect to single CSI which uses an AP CSI-RS, if T'<Z, the UE doesn't need to calculate CSI and reports the lowest channel quality indicator (CQI) to the eNB.

Here, T' represents a time duration between the reception time of the most recent AP CSI-RS and the transmission time of the first OFDM symbol of the AP CSI report.

And the proposal 5 reuses a relaxation method supported by the LTE system in the case of an A-CSI report trigger for a plurality of CSI.

Next, another embodiment will be described.

The time offset of a CSI reference resource is derived from Z' with respect to the CSI latency and numerology given as follows.

$n_{CQI\_ref}$ is the smallest value greater than or equal to $\lfloor Z'/N_{symb}^{slot} \rfloor$, such that slot $n-n_{CQI\_ref}$ corresponds to a valid downlink slot.

Or $n_{CQI\_ref}$ may be interpreted to be the same as $\lfloor Z'/N_{symb}^{slot} \rfloor$ or to be the smallest value among those values larger than $\lfloor Z'/N_{symb}^{slot} \rfloor$, such that slot $n-n_{CQI\_ref}$ corresponds to a valid downlink slot. This property may also be applied to at least aperiodic CSI report.

And this property is applied when an AP/P/SP CSI-RS is used for CSI calculation.

When a P/SP CSI-RS and/or CSI-IM is used for channel or interference measurement, the UE does not expect the last OFDM symbol to measure a channel and/or interference with respect to the CSI-RS and/or CSI-IM received from 0 to Z' symbols before the transmission time of the first OFDM symbol of the AP CSI reporting.

The aforementioned property is not the only condition, and the CSI-RS has to be defined at or before the CSI reference resource. This property also includes the case of the AP CSI-RS.

In the case of the AP CSI report, when the P/SP CSI-RS is used for channel and/or interference measurement, the UE does not expect the most recent CSI-RS to be received later than the CSI reference resource before triggering of the PDCCH.

In Table 10 below, (Z, Z') values are reference values that have to be supported by all of the UEs.

For normal UEs, it has not been determined yet about whether the (Z, Z') values with respect to low latency CSI and high latency CSI of Table 10 below are the same with each other for given numerology.

If the two values are the same with each other for all of the numerology, low latency and high latency are combined to normal UEs.

In Table 11 below, whether to support (Z, Z') values of Table 11 with respect to given numerology and CSI latency is reported to the eNB through UE capability.

For the given numerology and CSI latency, the (Z, Z') values of Table 11 haves to be equal to or smaller than the (Z, Z') values of Table 10.

Table 10 illustrates CSI calculation time Z for normal UEs.

TABLE 10

| CSI latency | Units | 15 kHz SCS | 30 kHz SCS | 60 kHz SCS | 120 kHz SCS |
|---|---|---|---|---|---|
| Low latency | Symbols | $(Z_{1,1}, Z'_{1,1})$ | $(Z_{1,2}, Z'_{1,2})$ | $(Z_{1,3}, Z'_{1,3})$ | $(Z_{1,4}, Z'_{1,4})$ |
| High latency | Symbols | $(Z_{2,1}, Z'_{2,1})$ | $(Z_{2,2}, Z'_{2,2})$ | $(Z_{2,3}, Z'_{2,3})$ | $(Z_{2,4}, Z'_{2,4})$ |

Table 11 illustrates CSI calculation time Z for advanced UEs.

TABLE 11

| CSI latency | Units | 15 kHz SCS | 30 kHz SCS | 60 kHz SCS | 120 kHz SCS |
|---|---|---|---|---|---|
| Low latency | Symbols | $(Z_{1,1}, Z'_{1,1})$ | $(Z_{1,2}, Z'_{1,2})$ | $(Z_{1,3}, Z'_{1,3})$ | $(Z_{1,4}, Z'_{1,4})$ |
| High latency | Symbols | $(Z_{2,1}, Z'_{2,1})$ | $(Z_{2,2}, Z'_{2,2})$ | $(Z_{2,3}, Z'_{2,3})$ | $(Z_{2,4}, Z'_{2,4})$ |

As yet another embodiment, a mechanism related to CSI reporting will be described further.

More specifically, CSI reporting timing and UE capability related thereto will be described.

In what follows, through Tables 12 and 13, specific values of (Z, Z') for a normal UE and an advanced UE will be examined.

For the Z' value of a normal UE, it is assumed that the UE performs CSI measurement/calculation and channel multiplexing; and CSI encoding and modulation for the Z' symbol.

Part of CSI measurement and calculation depends on the numerology and requires $6*2^{(\mu-2)}$ symbols; the remaining portions and channel multiplexing/CSI encoding/modulation uses 20 symbols respectively for a high latency and 13 symbols for a low latency.

As a result, Z' for the low latency and the high latency is $13+6*2^{(\mu-2)}$ and $20+6*2^{(\mu-2)}$.

For the Z value of a normal UE, it is assumed that a CSI-RS is located at the next symbol of a final PDCCH symbol.

Also, it is assumed that CSI processing may start after DCI decoding.

The DCI decoding time requires $4+10*2^{(\mu-2)}$ including a portion depending on a numerology such as PDCCH CE/demultiplexing/decoding and a portion independent of the numerology.

As a result, Z is determined by DCI decoding time+CSI processing time, namely $4+10*2^{(\mu-2)}+Z'$.

In the case of an advanced UE, since DCI decoding is conducted for 5 symbols, Z' is 7 symbols and 14 symbols, respectively for a low latency and a high latency; and Z is Z'+5.

Table 12 represents CSI calculation time (Z, Z') for a normal UE.

TABLE 12

| CSI latency | Units | 15 kHz SCS ($\mu = 0$) | 30 kHz SCS ($\mu = 1$) | 60 kHz SCS ($\mu = 2$) | 120 kHz SCS ($\mu = 3$) |
|---|---|---|---|---|---|
| Low latency | Symbols | (22, 15) | (25, 16) | (33, 19) | (49, 25) |
| High latency | Symbols | (29, 22) | (32, 23) | (40, 26) | (56, 32) |

Table 13 represents CSI calculation time (Z, Z') for an advanced UE.

TABLE 13

| CSI latency | Units | 15 kHz SCS ($\mu = 0$) | 30 kHz SCS ($\mu = 1$) | 60 kHz SCS ($\mu = 2$) | 120 kHz SCS ($\mu = 3$) |
|---|---|---|---|---|---|
| Low latency | Symbols | (12, 7) | (12, 7) | (12, 7) | (12, 7) |
| High latency | Symbols | (19, 14) | (19, 14) | (19, 14) | (19, 14) |

Various proposals related to the descriptions above will be examined.

The proposals to be described later may be applied separately from the proposals described above or applied together with the aforementioned proposals.

(Proposal 1')

As the minimum required CSI processing time for a normal and an advanced UEs, the (Z, Z') values of Tables 12 and 13 above are selected, respectively.

Regarding CSI and data multiplexing, one remaining problem is the number of symbols required for a UE to complete CSI processing and data encoding simultaneously.

When CSI and data are multiplexed, allocation of a data resource element (RE) depends on a CSI payload; however, CSI/payload size is varied according to CRI/RI/amplitude coefficient other than 0, or the number of CSI omission.

As a result, CSI processing and data encoding may not be performed in a fully parallel manner.

More specifically, in the case of type I CSI, CRI/RI of Part 1 determines the payload size of Part 2 CSI such as PMI and CQI.

In the case of type II CSI, the number of non-zero amplitude coefficients of RI/Part 1 CSI determines the payload size of Part 2 CSI such as PMI and CQI.

Therefore, when CSI and data are multiplexed, instead of (Z, Z'), the UE requires at least (Z+C, Z'+C) symbol to prepare CSI and data simultaneously.

Here, C is smaller than or equal to N2.

(Proposal 2')

When AP CSI and data for a PUSCH are multiplexed, the UE is not expected to receive scheduling DCI having a symbol offset such that M−L−N<Z+C.

Here, L represents the last symbol of a PDCCH triggering an A-CSI report, L is a start symbol of a PUSCH, N is a TA value in symbol units, and C is equal to or smaller than N2.

(Proposal 3')

When AP CSI and data for a PUSCH are multiplexed, and an AP CSI-RS is used for channel measurement, the UE is not expected to receive scheduling DCI having a symbol offset such that M−O−N<Z'+C.

Here, N represents a TA value in symbol units; O represents a value which comes late among the last symbol of an AP CSI-RS resource for a CMR, the last symbol of an aperiodic NZP CSI-RS for an IM (if exists), and the last symbol of an aperiodic CSI-IM (if exists); and C is equal to or smaller than N2.

Also, when AP CSI and data for a PUSCH are multiplexed, although the time position of a CSI reference resource is determined in the same manner for the AP CSI only case, the time position is determined based on Z'+C instead of Z'.

(Proposal 4')

When AP CSI and data for a PUSCH are multiplexed, a time offset of a CSI reference resource is derived from Z'+C with respect to a given CSI latency and a numerology.

The time offset of a CSI reference resource is derived from Z' with respect to a given CSI latency and a numerology as follows.

$n_{CQI\_ref}$ is the smallest value greater than or equal to $\lfloor (Z'+C)/N_{symb}^{slot} \rfloor$, such that slot $n-n_{CQI\_ref}$ corresponds to a valid downlink slot.

When a P/SP CSI-RS and/or CSI-IM is used for channel measurement and/or interference measurement, the UE does not expect the last OFDM symbol to measure a channel and/or interference with respect to the CSI-RS and/or CSI-IM received from 0 to Z'+C symbols before the transmission time of the first OFDM symbol of an AP CSI report.

Another issue is calculation time for a beam report, namely CRI and layer 1 reference signal received power (L1 RSRP).

When L1 RSRP is power measurement of a single port, and the same calculated power is used for a CSI report and a beam report, it is preferable to regard the L1 RSRP as low latency CSI.

Also, to reduce calculation complexity, the number of CSI-RS resources for a beam report may be limited.

(Proposal 5')

The same (Z, Z') is applied for a beam report from low latency CSI as in the CSI report.

Next, in the case of an A-CSI report trigger for a plurality of N CSI, if the UE is equipped with X parallel processors, and X≥N, the same mechanism as a single CSI report trigger may be used without relaxation.

However, if more than X CSIs are triggered, the UE is unable to complete the calculation for all of the triggered CSIs.

In this case, a relaxation method supported in the LTE system may be reused.

In particular, if the UE does not have an unreported CSI(s), and N>X, the UE does not necessarily have to calculate N−X CSI(s).

(Proposal 6')

In the case of an A-CSI report trigger for a plurality of CSI, a relaxation method supported in the LTE system may be reused.

More specifically, if the UE is equipped with X parallel CSI processors and have N unreported CSI(s), and N>X, the UE does not necessarily have to update N−X most recent CSI(s).

Regarding the time position of a reference resource for P/SP CSI reporting, the same method for the time position of a reference resource for AP CSI reporting may be applied.

(Proposal 7')

The reference resource time position for P/SP CSI reporting may be determined by the same method for the reference resource time position for AP CSI reporting.

Particulars related to CSI relaxation will be described in more detail.

X represents capability for the maximum number of CSIs that may be updated simultaneously.

If CSI processing time intervals of N (>X) CSI reports overlap with each other in the time domain, the UE does not need to update N−X CSI reports.

A CSI processing time interval is a time interval which ranges from the start of a symbol S to the last of a symbol E.

Here, regarding periodic and semi-persistent CSI reporting, (1) In the case of Alt. 1, S is a start symbol of a CQI reference resource slot.

(2) In the case of Alt. 2,

S is E−Z' (or E−(Z'+1)), and E is a start symbol of a CSI report.

Since the NR sets the location of a channel measurable CSI-RS at the symbol level (in other words, a CSI-RS located at a symbol below E−Z' or at a symbol below E−(Z'+1) is measured), Alt. 2 proposes the latest time at which CSI processing may be started.

In other words, the UE may start CSI processing at the time S of Alt. 2 at the latest.

(3) In the case of Alt. 3,

S is the location of the start symbol of a CSI report—Z' (or start symbol of a CSI report—(Z'+1)) or the last symbol of the CSI-RS (which is used for calculation of the corresponding CSI) received at the most recent time point among the time points before the start symbol.

Since the UE starts CSI calculation by using the CSI-RS at the aforementioned time point, the UE is appropriate for S and satisfies that E=S+Z'.

Next, regarding a CSI report and a CSI-IM having a periodic or semi-persistent CSI-RS, (1) In the case of Alt. 1, If a reference resource is located before a PUCCH with aperiodic CSI triggering, S becomes the last symbol of the PDCCH with aperiodic CSI triggering, and E=S+Z.

Otherwise, S=E−Z', and E is the start symbol of a CSI report.

(2) In the case of Alt. 2,

If the start symbol of a CSI report—Z' (or start symbol of a CSI report—(Z'+1)) is located before the PDCCH with aperiodic CSI triggering, S is the last symbol with aperiodic CSI triggering (or S is the last symbol of the PDCCH with aperiodic CSI triggering+1), and E=S+Z.

In other words, if a measurable CSI-RS is received before the PDCCH, the UE may start CSI calculation after receiving the PDCCH.

Since the minimum required time until a CSI report is completed after reception of the PDCCH is Z, the time at which the CSI calculation is finished becomes S+Z.

Otherwise, S is E−Z' (or E−(Z'+1)), and E is the start symbol of a CSI report.

In other words, if a measurable CSI-RS is received after the PDCCH, the UE may start CSI calculation after receiving the CSI-RS.

Since the minimum required time until the CSI report is completed after reception of the CSI-RS is Z', the time at which CSI calculation is finished becomes S+Z'.

(3) In the case of Alt. 3,

Suppose the most recent CSI-RS received at or before the start symbol of CSI report—Z' (or start symbol of CSI report—(Z'+1)) is a 'reference CSI-RS'. If the last symbol of a reference CSI-RS is located before the PDCCH with aperiodic CSI triggering, S becomes the last symbol of the PDCCH with aperiodic CSI triggering (or last symbol of the PDCCH with aperiodic CSI triggering+1), and E=S+Z.

In other words, if a measurable CSI-RS is received before the PDCCH, the UE may start CSI calculation after receiving the PDCCH.

Since the minimum required time until a CSI report is completed after reception of the PDCCH is Z, the time at which CSI calculation is finished becomes S+Z.

Otherwise, S=E−Z' (or E−(Z'+1)), and E is the start symbol of a CSI report.

In other words, if a measurable CSI-RS is received after the PDCCH, the UE may start CSI calculation after receiving the CSI-RS.

Since the minimum required time until a CSI report is completed after receiving the CSI-RS is Z', the time at which CSI calculation is finished becomes S+Z'.

(4) In the case of Alt. 4,

S is E−Z' (or E−(Z'+1)), and E is the start symbol of a CSI report.

Next, regarding an aperiodic CSI report with an aperiodic CSI-RS and a CSI-IM,

S1 is the last symbol of a PDCCH with aperiodic CSI triggering.

S2 is the symbol which comes late among the last symbol of an aperiodic CSI-RS with respect to a CMR, the last symbol of the aperiodic CSI-RS with respect to an IMR, and the last symbol of the aperiodic CSI-IM.

(1) In the case of Alt. 1,

If S1+Z>S2+Z' (in other words, if the location of an OFDM symbol added by Z symbols in S1 lies after the OFDM symbol location added by Z' symbols in S2), S=S1, and E=S1+Z.

Otherwise, S=S2, and E=S2+Z'.

The UE terminates CSI processing at a later time between S1+Z and S2+Z'.

Therefore, E is set to the later of the two, and the start time of which is completed later between the two is assumed to be the start of CSI processing.

(2) In the case of Alt. 2,

It is set such that S=S2.

If S1+Z>S2+Z (in other words, if the location of an OFDM symbol added by Z symbols in S1 lies after the OFDM symbol location added by Z' symbols in S2), E=S1+Z. Otherwise, E=S2+Z'.

Here, the end time of CSI processing in Alt. 2 is the same as that of Alt. 1, but the start time is fixed to S2 which is used for channel and/or interference estimation.

This is so because an AP CSI-RS is always restricted to be received after reception of a PDCCH, and in this case, the UE is able to start CSI processing at least when the reception of the CSI-RS is completed.

(3) In the case of Alt. 3,

S is E−Z' (or E−(Z'+1)), and E is the start symbol of a CSI report.

When CSI is calculated by using a P/SP CSI-RS and/or CSI-Interference Measurement (IM), a plurality of measurable CSI-RSs may exist in the time domain.

The UE may calculate CSI by measuring a CSI-RS received as recently as possible with respect to a CSI reporting time, thereby obtaining fresh CSI.

At this time, too, a CSI-RS located before reporting time—Z' has to be measured by taking into account the CSI calculation time of the UE.

However, if the CSI (which is called 'CSI 1') calculation time overlaps with other CSI (which is called 'CSI 2') calculation time, and the number of CSIs that may be calculated at the same time is exceeded, the UE is unable to calculate part of CSIs.

To solve the problem above, the calculation time of CSI 1 may be put to an earlier time so that it may not be overlapped with the CSI 2.

This is possible since the CSI 1 is calculated by using a P/SP CSI-RS and/or CSI-IM, a plurality of P/SP CSI-RSs and/or CSI-IMs exist along the time axis, and thereby the CSI 1 may be calculated in advance by using the P/SP CSI-RS and/or CSI-IM received previously.

However, it should be noted that if the CSI 1 is calculated too early, a potential interval is introduced to avoid a situation where CSI is outdated, and the CSI 1 may be calculated in advance by using the P/SP CSI-RS and/or CSI-IM received within the potential interval.

A potential interval (namely the N value proposed below) may be determined by the eNB and indicated for the UE; or the UE may determine the potential interval and report the determined potential interval to the eNB.

The potential interval is terminated at "reporting time—Z" and starts at the end time—N time.

When a plurality of CSIs are reported through the same PUSCH, channel multiplexing/encoding/modulation is performed simultaneously to a plurality of the corresponding CSIs, and therefore, a smaller amount of processing time is required than the case where a plurality of CSIs are reported through a different PUSCH.

Therefore, when a plurality of CSIs are reported through the same PUSCH, one of the CSIs requires CSI processing time T, but the remaining CSI(s) requires only the time needed for "T—channel multiplexing/encoding/modulation".

Therefore, when processing time is defined for CSI relaxation, the remaining CSI is defined as "T-channel multiplexing/encoding/modulation", and as a result, the possibility that the processing time overlaps with other CSI may be reduced.

And when channel and/or interference is measured by using a periodic or semi-persistent CSI-RS, a plurality of measurable CSI-RSs may exist along the time axis.

In this case, the UE calculates CSI by measuring a CSI-RS existing before Z' (or Z'+1) symbol with reference to the first OFDM symbol which starts CSI reporting.

Therefore, the latest time at which the UE measures CSI for CSI calculation becomes "the symbol before Z' (or Z'+1) symbols with reference to the first OFDM symbol which starts CSI reporting".

Therefore, it is preferable to set the start time of CSI processing as "the symbol before Z' (or Z'+1) symbols with reference to the first OFDM symbol which starts CSI reporting".

And it is preferable to set the end time of CSI processing as the first OFDM symbol which starts CSI reporting.

On the other hand, when channel and/or interference is measured by using an aperiodic CSI-RS, one measurable CSI-RS may exist along the time axis.

Therefore, it is preferable to set the start time of CSI processing as "the very last symbol at which an AP CSI-RS and/or AP CSI-IM is received".

In the case of periodic or semi-persistent CSI reporting, a reporting time is defined in advance.

Therefore, the UE knows the location of a recent CSI-RS existing before Z' (or Z'+1) symbol with reference to the first OFDM symbol which starts CSI reporting.

Therefore, since calculation may be started from the corresponding CSI-RS, S becomes the last OFDM symbol of the corresponding CSI-RS, and E becomes S+Z'.

In the case of AP CSI reporting, when an AP CSI-RS is used, one CSI-RS used for CSI calculation exists along the time axis.

It should be noted that since a CSI-RS for CMR uses is different from a CSI-RS for IMR uses, there exist one CSI-RS for each use along the time axis.

Therefore, since calculation may be started from the corresponding CSI-RS, S becomes the last OFDM symbol of the corresponding CSI-RS, and E becomes S+Z'.

In the case of AP CSI reporting, when a P/SP CSI-RS is used, the most recent CSI-RS used for CSI calculation may be received before DCI.

Therefore, if the last OFDM symbol of the corresponding CSI-RS is set to S, the UE starts to calculate CSI at a time at which it is uncertain whether the corresponding CSI may be triggered or not.

If the corresponding CSI is not triggered, the UE wastes computation power, and a problem may arise, such that the corresponding computation power is not used for other CSI calculation.

To solve the problem above, S is defined such that S=E−Z', and E is defined as the first symbol of PUSCH CSI reporting.

Various combinations are possible for S and E proposed in the different Alt.s, above, and corresponding combinations are also applicable to a method proposed by the present specification.

For example, S and E may be determined by the S of Alt. 1 and the E of Alt. 2.

And in the proposals 2 and 3 above, Z' may be replaced with Z'−1.

Since the UE may still be able to calculate CSI even if Z' time is given, which ranges from a CSI-RS and/or CSI-IM to the start symbol of CSI reporting, Z' may be replaced with Z'−1.

For the same reason, in the proposal 4 above, Z' may be replaced with

Z'−1.

Next, the calculation of the CSI will be described in more detail from the viewpoint of implementation.

Two implementations of a CSI processor that is in charge of the calculation of the CSI are available.

Type A corresponds to a serial processor.

The UE may have X (type A) CSI processing units and a minimum time required for calculating one CSI may be defined as (Z, Z').

When the UE may simultaneously calculate CSIs of X or less and in this case, the required time needs to be sequentially calculated for X CSIs one by one, a minimum time of a sum (e.g., Z' sum) of a value (Z, Z') corresponding to each of each of X CSIs is required.

When locations of X CSI-RSs or CSI-IMs are the same as each other, it is determined whether a given calculation time is sufficient according to a time when a time as much as Z' sum is added at the location of the CSI-RS and/or CSI-IM (a last symbol of the CSI-RS and/or CSI-IM or a first symbol of the CSI-RS and/or CSI-IM) is before or after reporting.

When the sufficient time is given, the UE updates the CSI and reports the CSI to the eNB.

Otherwise, the UE does not update the CSI, transmits a dummy CSI, or ignores the trigger and does not transmit anything to the eNB.

When the locations of X CSI-RSs or CSI-IMs are different from each other, it is determined whether a given calculation time is sufficient according to a time when a time as much as Z' sum is added at the symbol location of the CSI-RS and/or CSI-IM which is most recently received is before or after reporting.

Since the eNB has a degree of freedom in which the locations of X CSI-RSs/CSI-IMs may be differently configured, it is needs to be determined whether the given calculation time is sufficient by a latter scheme.

Operation methods of UE and eNB

Hereinafter, operations of the UE and the eNB for performing the method proposed by the present invention will be described will be described with reference to FIGS. 17 to 22.

FIG. 17 is a flowchart illustrating an example of an operation method of a UE that performs a CSI report proposed by the present invention.

First, the UE receives from the eNB a radio resource control (RRC) signaling including one or more reporting settings.

Here, the reporting setting includes first values indicating a time offset for the CSI report.

The first value may be expressed as Y.

The CSI report may be an aperiodic CSI report.

In addition, the UE receives from the eNB downlink control information (DCI) for triggering the CSI report (S1720).

The DCI includes control information for a transmission time point of a physical uplink shared channel (PUSCH).

The control information may be represented by n bit(s). Here, the n is a natural number or non-negative integer.

For example, when the control information is represented by 2 bits, each state value may be 00, 01, 10, or 11.

In addition, when a plurality of reporting settings is triggered by the DCI, the UE determines a largest value among the first values corresponding to the control information in lists for the first values of the plurality of reporting settings as a second value (S1730).

The 00 may correspond to a first entry in the list for the first values, the 01 may correspond to a second entry in the list for the first values, the 10 may correspond to a second entry in the list for the first values, and the 11 may correspond to a fourth entry in the list for the first values.

In addition, the UE reports the CSI to the eNB on the PUSCH based on the second value (S1740).

The DCI may be received on slot n and the CSI may be reported on slot (n+second value).

The operation of the UE of FIG. 17 may be interpreted as follows.

The UE receives, from a base station, a radio resource control (RRC) signaling that comprises a plurality of reporting settings, wherein each reporting setting comprises a corresponding list of first values representing time offsets for transmitting a CSI report, forming a plurality of lists of first values.

And, the UE receives, from the base station, downlink control information (DCI) triggering the CSI report, wherein the DCI comprises an index value related to a time at which to transmit the CSI report on a physical uplink shared channel (PUSCH).

And, the UE determines, based on the DCI, a plurality of list entries by determining, for each list in the plurality of lists of first values, a corresponding list entry that is indexed in the list based on the index value.

And, the UE determines a second value that is largest among the plurality of list entries.

And, the UE transmits, to the base station, the CSI report on the PUSCH based on the second value.

Here, the CSI report comprises an aperiodic CSI report.

Additionally, the UE may receive the DCI on a slot n, and transmit the CSI report on a slot n+(second value).

The index value is represented by 2 bits, and the index value is represented by one of 00, 01, 10 or 11.

More specifically, the index value of 00 corresponds to a first entry in each of the plurality of lists of first values, the index value of 01 corresponds to a second entry in each of the plurality of lists of first values, the index value of 10 corresponds to a third entry in each of the plurality of lists of first values, and the index value 11 corresponds to a fourth entry in each of the plurality of lists of first values.

Here, the index value may be greater than or equal to zero, and each list entry is indexed in the corresponding list of first values at a position corresponding to 1+(index value) in the list.

FIG. 18 is a flowchart illustrating an example of an operation method of an eNB that receives a CSI report proposed by the present invention.

First, the eNB receives from the UE the radio resource control (RRC) signaling including one or more reporting settings.

Here, the reporting setting includes the list for the first values indicating the time offset for the CSI report.

The first value may be expressed as Y.

The CSI report may be the aperiodic CSI report.

In addition, the eNB transmits to the UE the downlink control information (DCI) for triggering the plurality of reporting settings (S1820).

The DCI includes control information for a transmission time point of a physical uplink shared channel (PUSCH).

The control information may be represented by n bit(s). Here, the n is a natural number or non-negative integer.

For example, when the control information is represented by 2 bits, each state value may be 00, 01, 10, or 11.

In addition, the eNB receives the CSI report from the UE on the PUSCH (S1830).

The CSI report may be associated with the second value and the second value may be the largest value among the first values corresponding to the control information in the lists for the first values of the plurality of reporting settings.

The 00 may correspond to a first entry in the list for the first values, the 01 may correspond to a second entry in the list for the first values, the 10 may correspond to a second entry in the list for the first values, and the 11 may correspond to a fourth entry in the list for the first values.

The DCI may be received on slot n and the CSI may be reported on slot (n+second value).

The operation of the eNB of FIG. 18 may be interpreted as follows.

The eNB transmits, to a UE, a radio resource control (RRC) signaling that comprises a plurality of reporting settings, wherein each reporting setting comprises a corresponding list of first values representing time offsets for transmitting a CSI report, forming a plurality of lists of first values.

And, the eNB transmits, to the UE, downlink control information (DCI) triggering the CSI report, wherein the DCI comprises an index value related to a time at which to transmit the CSI report on a physical uplink shared channel (PUSCH).

And, the eNB receives, from the UE, the CSI report on the PUSCH based on the second value.

Here, the second value that is largest among the plurality of list entries.

And, the plurality of list entries may be determined by a plurality of list entries by determining, for each list in the plurality of lists of first values, a corresponding list entry that is indexed in the list.

Here, the CSI report comprises an aperiodic CSI report.

Additionally, the DCI may receive on a slot n, and the CSI report transmit on a slot n+(second value).

The index value is represented by 2 bits, and the index value is represented by one of 00, 01, 10 or 11.

More specifically, the index value of 00 corresponds to a first entry in each of the plurality of lists of first values, the index value of 01 corresponds to a second entry in each of the plurality of lists of first values, the index value of 10 corresponds to a third entry in each of the plurality of lists of first values, and the index value 11 corresponds to a fourth entry in each of the plurality of lists of first values.

Here, the index value may be greater than or equal to zero, and each list entry is indexed in the corresponding list of first values at a position corresponding to 1+(index value) in the list.

Referring to FIGS. 19 to 22 to be described below, a process of implementing the method for reporting the CSI proposed by the present invention in the UE will be described in more detail.

That is, the UE comprises a radio frequency (RF) module, at least one processor, and at least one computer memory operably connectable to the at least one processor and storing instructions that, when executed, cause the at least one processor to perform operations comprising: receiving, from a base station, a radio resource control (RRC) signaling that comprises a plurality of reporting settings, wherein each reporting setting comprises a corresponding list of first values representing time offsets for transmitting a CSI report, forming a plurality of lists of first values; receiving, from the base station, downlink control information (DCI) triggering the CSI report, wherein the DCI comprises an index value related to a time at which to transmit the CSI report on a physical uplink shared channel (PUSCH); determining, based on the DCI, a plurality of list entries by determining, for each list in the plurality of lists of first values, a corresponding list entry that is indexed in the list based on the index value; determining a second value that is largest among the plurality of list entries; and transmitting, to the base station, the CSI report on the PUSCH based on the second value.

Here, the CSI report comprises an aperiodic CSI report.

Additionally, the UE may receive the DCI on a slot n, and transmit the CSI report on a slot n+(second value).

The index value is represented by 2 bits, and the index value is represented by one of 00, 01, 10 or 11.

More specifically, the index value of 00 corresponds to a first entry in each of the plurality of lists of first values, the index value of 01 corresponds to a second entry in each of the plurality of lists of first values, the index value of 10 corresponds to a third entry in each of the plurality of lists of first values, and the index value 11 corresponds to a fourth entry in each of the plurality of lists of first values.

Here, the index value may be greater than or equal to zero, and each list entry is indexed in the corresponding list of first values at a position corresponding to 1+(index value) in the list.

Referring to FIGS. 19 to 22 to be described below, a process of implementing the method for reporting the CSI proposed by the present invention in the eNB will be described in more detail.

That is, the UE comprises a radio frequency (RF) module, at least one processor, and at least one computer memory operably connectable to the at least one processor and storing instructions that, when executed, cause the at least one processor to perform operations comprising: transmitting, to a UE, a radio resource control (RRC) signaling that comprises a plurality of reporting settings, wherein each reporting setting comprises a corresponding list of first values representing time offsets for transmitting a CSI report, forming a plurality of lists of first values; transmitting, to the UE, downlink control information (DCI) triggering the CSI report, wherein the DCI comprises an index value related to a time at which to transmit the CSI report on a physical uplink shared channel (PUSCH); and receiving, from the UE, the CSI report on the PUSCH based on the second value.

Here, the CSI report comprises an aperiodic CSI report.

Additionally, the DCI may receive on a slot n, and the CSI report transmit on a slot n+(second value).

The index value is represented by 2 bits, and the index value is represented by one of 00, 01, 10 or 11.

More specifically, the index value of 00 corresponds to a first entry in each of the plurality of lists of first values, the index value of 01 corresponds to a second entry in each of the plurality of lists of first values, the index value of 10 corresponds to a third entry in each of the plurality of lists of first values, and the index value 11 corresponds to a fourth entry in each of the plurality of lists of first values.

Here, the index value may be greater than or equal to zero, and each list entry is indexed in the corresponding list of first values at a position corresponding to 1+(index value) in the list.

Overview of Devices to Which Present Invention is Applicable

FIG. 19 illustrates a block diagram of a wireless communication device to which methods proposed in the present invention may be applied.

Referring to FIG. 19, a wireless communication system includes an eNB 1910 and multiple UEs 1920 positioned within an area of the eNB.

Each of the eNB and the UE may be expressed as a wireless device.

The eNB includes a processor 1911, a memory 1912, and a radio frequency (RF) module 1913. The processor 1911 implements a function, a process, and/or a method which are proposed in FIGS. 1 to 18 above. Layers of a radio interface protocol may be implemented by the processor. The memory is connected with the processor to store various information for driving the processor. The RF module is connected with the processor to transmit and/or receive a radio signal.

The UE includes a processor 1921, a memory 1922, and an RF module 1923.

The processor implements a function, a process, and/or a method which are proposed in FIGS. 1 to 18 above. Layers of a radio interface protocol may be implemented by the processor. The memory is connected with the processor to store various information for driving the processor. The RF module is connected with the processor to transmit and/or receive a radio signal.

The memories 1912 and 1922 may be positioned inside or outside the processors 1911 and 1921 and connected with the processor by various well-known means.

Further, the eNB and/or the UE may have a single antenna or multiple antennas.

The antennas 1914 and 1924 serve to transmit and receive the radio signals.

FIG. 20 illustrates a block diagram of a communication device according to an embodiment of the present invention.

In particular, FIG. 20 is a diagram more specifically illustrating the UE of FIG. 19 above.

Referring to FIG. 20, the UE may be configured to include a processor (or a digital signal processor (DSP)) 2010, an RF module (or RF unit) 2035, a power management module 2005, an antenna 2040, a battery 2055, a display 2015, a keypad 2020, a memory 2030, a subscriber identification module (SIM) card 2025 (This component is optional), a speaker 2045, and a microphone 2050. The UE may also include a single antenna or multiple antennas.

The processor 2010 implements a function, a process, and/or a method which are proposed in FIGS. 1 to 18 above. Layers of a radio interface protocol may be implemented by the processor.

The memory 2030 is connected with the processor and stores information related with an operation of the processor. The memory may be positioned inside or outside the processor and connected with the processor by various well-known means.

A user inputs command information such as a telephone number or the like by, for example, pressing (or touching) a button on the keypad 2020 or by voice activation using the microphone 2050. The processor receives such command information and processes to perform appropriate functions including dialing a telephone number. Operational data may be extracted from the SIM card 2025 or the memory 2030. In addition, the processor may display command information or drive information on the display 2015 for the user to recognize and for convenience.

The RF module 2035 is connected with the processor to transmit and/or receive an RF signal. The processor transfers the command information to the RF module to initiate communication, for example, to transmit radio signals constituting voice communication data. The RF module is constituted by a receiver and a transmitter for receiving and transmitting the radio signals. The antenna 2040 functions to transmit and receive the radio signals. Upon receiving the radio signals, the RF module may transfer the signal for processing by the processor and convert the signal to a baseband. The processed signal may be converted into to audible or readable information output via the speaker 2045.

FIG. 21 is a diagram illustrating an example of an RF module of the wireless communication device to which the method proposed in the present invention may be applied.

Specifically, FIG. 21 illustrates an example of an RF module that may be implemented in a frequency division duplex (FDD) system.

First, in a transmission path, the processors described in FIGS. 19 and 20 process the data to be transmitted and provide an analog output signal to the transmitter 2110.

Within the transmitter 2110, the analog output signal is filtered by a low pass filter (LPF) 2111 to remove images caused by a digital-to-analog conversion (ADC) and up-converted to an RF from a baseband by an up-converter (mixer) 2112, and amplified by a variable gain amplifier (VGA) 2113 and the amplified signal is filtered by a filter 2114, additionally amplified by a power amplifier (PA) 2115, routed through a duplexer(s) 2150/an antenna switch(es) 2160, and transmitted through an antenna 2170.

In addition, in a reception path, the antenna receives signals from the outside and provides the received signals, which are routed through the antenna switch(es) 2160/duplexers 2150 and provided to a receiver 2120.

In the receiver 2120, the received signals are amplified by a low noise amplifier (LNA) 2123, filtered by a bans pass filter 2124, and down-converted from the RF to the baseband by a down-converter (mixer) 2125.

The down-converted signal is filtered by a low pass filter (LPF) 2127 and amplified by a VGA 1127 to obtain an analog input signal, which is provided to the processors described in FIGS. 19 and 20.

Further, a local oscillator (LO) generator 2140 also provides transmitted and received LO signals to the up-converter 2112 and the down-converter 2125, respectively.

In addition, a phase locked loop (PLL) 2130 receives control information from the processor to generate the transmitted and received LO signals at appropriate frequencies and provides control signals to the LO generator 2140.

Further, circuits illustrated in FIG. 21 may be arranged differently from the components illustrated in FIG. 21.

FIG. 22 is a diagram illustrating another example of the RF module of the wireless communication device to which the method proposed in the present invention may be applied.

Specifically, FIG. 22 illustrates an example of an RF module that may be implemented in a time division duplex (TDD) system.

A transmitter 2210 and a receiver 2220 of the RF module in the TDD system are identical in structure to the transmitter and the receiver of the RF module in the FDD system.

Hereinafter, only the structure of the RF module of the TDD system that differs from the RF module of the FDD system will be described and the same structure will be described with reference to a description of FIG. 21.

A signal amplified by a power amplifier (PA) 2215 of the transmitter is routed through a band select switch 2250, a band pass filter (BPF) 2270, and an antenna switch(es) 2280 and transmitted via an antenna 2280.

In addition, in a reception path, the antenna receives signals from the outside and provides the received signals, which are routed through the antenna switch(es) 2270, the band pass filter 2260, and the band select switch 2250 and provided to the receiver 2220.

In the embodiments described above, the components and the features of the present invention are combined in a predetermined form. Each component or feature should be considered as an option unless otherwise expressly stated. Each component or feature may be implemented not to be associated with other components or features. Further, the embodiment of the present invention may be configured by associating some components and/or features. The order of the operations described in the embodiments of the present invention may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present invention may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present invention may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present invention may be embodied in other specific forms without departing from essential characteristics of the present invention. Accordingly, the aforementioned detailed description should not be construed as restrictive in all terms and should be exemplarily considered. The scope of the present invention should be determined by rational construing of the appended claims and all modifications within an equivalent scope of the present invention are included in the scope of the present invention.

Although a method for reporting CSI in a wireless communication system of the present invention has been described with reference to an example applied to a 3GPP LTE/LTE-A system or a 5G system (New RAT system), the scheme may be applied to various wireless communication systems in addition to the 3GPP LTE/LTE-A system or 5G system.

According to the present invention, when a plurality of reporting settings is triggered by DCI, a largest value among slot offset values (associated with a CSI report included in each reporting setting) corresponding to the DCI is defined a slot offset associated with the CSI report, and as a result, a UE can normally perform the CSI report.

Advantages which can be obtained in the present invention are not limited to the aforementioned effects and other unmentioned advantages will be clearly understood by those skilled in the art from the following description.

What is claimed is:

1. A method of reporting, by a user equipment (UE), channel state information (CSI) in a wireless communication system, the method comprising:
   receiving, from a base station, a plurality of lists of first values representing time offsets for transmitting a CSI report;
   receiving, from the base station, an index value related to a time at which to transmit the CSI report on a physical uplink shared channel (PUSCH);
   determining a plurality of list entries by determining, for each list in the plurality of lists of first values, a corresponding list entry that is indexed in the list based on the index value;
   determining a second value that is largest among the plurality of list entries; and transmitting, to the base station, the CSI report on the PUSCH based on the second value.

2. The method of claim 1, wherein the CSI report comprises an aperiodic CSI report.

3. The method of claim 1, wherein receiving the index value comprises receiving the index value on a slot n, and
wherein transmitting the CSI report comprises transmitting the CSI report on a slot n+(second value).

4. The method of claim 1, wherein the index value is represented by 2 bits, and wherein the index value is represented by one of 00, 01, 10 or 11.

5. The method of claim 1, wherein the index value is greater than or equal to zero, and
wherein each list entry is indexed in a corresponding list of first values at a position corresponding to 1+(index value) in the list.

6. A user equipment (UE) configured to report channel state information (CSI) in a wireless communication system, the UE comprising:
a radio frequency (RF) module;
at least one processor; and
at least one computer memory operably connectable to the at least one processor and storing instructions that, when executed, cause the at least one processor to perform operations comprising:
receiving, from a base station, a plurality of lists of first values representing time offsets for transmitting a CSI report;
receiving, from the base station, an index value related to a time at which to transmit the CSI report on a physical uplink shared channel (PUSCH);
determining a plurality of list entries by determining, for each list in the plurality of lists of first values, a corresponding list entry that is indexed in the list based on the index value;
determining a second value that is largest among the plurality of list entries; and
transmitting, to the base station, the CSI report on the PUSCH based on the second value.

7. The UE of claim 6, wherein the CSI report comprises an aperiodic CSI report.

8. The UE of claim 6, wherein the index value is received on a slot n, and wherein the CSI report is transmitted on a slot n+(second value).

9. The UE of claim 6, wherein the index value is represented by 2 bits, and wherein the index value is represented by one of 00, 01, 10 or 11.

10. The UE of claim 6, wherein the index value is greater than or equal to zero, and
wherein each list entry is indexed in a corresponding list of first values at a position corresponding to 1+(index value) in the list.

11. A method of receiving, by a base station (BS), channel state information (CSI) in a wireless communication system, the method comprising:
transmitting, to a user equipment (UE), a plurality of lists of first values representing time offsets for transmitting a CSI report;
transmitting, to the UE, an index value related to a time at which to transmit, by the UE, the CSI report on a physical uplink shared channel, PUSCH,
wherein corresponding list entries in each list of the plurality of lists of first values are determined based on the index value; and
receiving, from the UE, the CSI report on the PUSCH based on a second value,
wherein the second value is the largest among the corresponding list entries.

12. The method of claim 11, wherein the CSI report comprises an aperiodic CSI report.

13. The method of claim 11, wherein transmitting the index value comprises transmitting the index value on a slot n, and
wherein receiving the CSI report comprises receiving the CSI report on a slot n+(second value).

14. The method of claim 11, wherein the index value is represented by 2 bits, and
wherein the index value is represented by one of 00, 01, 10 or 11.

15. The method of claim 11, wherein the index value is greater than or equal to zero, and
wherein each list entry is indexed in a corresponding list of first values at a position corresponding to 1+(index value) in the list.

16. A base station (BS) configured to receive channel state information (CSI) in a wireless communication system, the BS comprising:
a radio frequency (RF) module;
at least one processor; and
at least one computer memory operably connectable to the at least one processor and storing instructions that, when executed, cause the at least one processor to perform operations comprising:
transmitting, to a user equipment (UE), a plurality of lists of first values representing time offsets for transmitting a CSI report;
transmitting, to the UE, an index value related to a time at which to transmit, by the UE, the CSI report on a physical uplink shared channel, PUSCH,
wherein corresponding list entries in each list of the plurality of lists of first values are determined based on the index value; and
receiving, from the UE, the CSI report on the PUSCH based on a second value,
wherein the second value is the largest among the corresponding list entries.

17. The BS of claim 16, wherein the CSI report comprises an aperiodic CSI report.

18. The BS of claim 16, wherein the index value is transmitted on a slot n, and wherein the CSI report is received on a slot n+(second value).

19. The BS of claim 16, wherein the index value is represented by 2 bits, and wherein the index value is represented by one of 00, 01, 10 or 11.

20. The BS of claim 16, wherein the index value is greater than or equal to zero, and
wherein each list entry is indexed in a corresponding list of first values at a position corresponding to 1+(index value) in the list.

* * * * *